United States Patent [19]

Rosenthal et al.

[11] Patent Number: 5,909,595
[45] Date of Patent: Jun. 1, 1999

[54] METHOD OF CONTROLLING I/O ROUTING BY SETTING CONNECTING CONTEXT FOR UTILIZING I/O PROCESSING ELEMENTS WITHIN A COMPUTER SYSTEM TO PRODUCE MULTIMEDIA EFFECTS

[75] Inventors: David S. H. Rosenthal, Palo Alto; Curtis Priem, Fremont, both of Calif.

[73] Assignee: NVidia Corporation, Santa Clara, Calif.

[21] Appl. No.: 08/912,798

[22] Filed: Aug. 18, 1997

Related U.S. Application Data

[63] Continuation of application No. 08/441,083, May 15, 1995, abandoned.

[51] Int. Cl.$^6$ .................................................. G06F 13/14
[52] U.S. Cl. ........................ 395/858; 395/311; 395/855; 395/872; 395/881
[58] Field of Search ...................... 395/872, 311, 395/855, 881, 858; 345/302; 707/1

[56] References Cited

U.S. PATENT DOCUMENTS

| | | | |
|---|---|---|---|
| 4,812,996 | 3/1989 | Stubbs | 364/487 |
| 4,868,785 | 9/1989 | Jordan et al. | 364/900 |
| 4,901,221 | 2/1990 | Kodosky et al. | 364/200 |
| 4,922,410 | 5/1990 | Morikawa et al. | 395/823 |
| 5,060,140 | 10/1991 | Brown et al. | 395/285 |
| 5,068,823 | 11/1991 | Robinson | 395/500 |
| 5,107,489 | 4/1992 | Brown et al. | 370/58.2 |
| 5,136,705 | 8/1992 | Stubbs et al. | 395/575 |
| 5,309,352 | 5/1994 | Stubbs | 364/140 |
| 5,361,367 | 11/1994 | Fijany et al. | 395/800.15 |
| 5,465,355 | 11/1995 | Cook et al. | 395/858 |
| 5,481,740 | 1/1996 | Kodosky | 395/800 |
| 5,487,167 | 1/1996 | Dinallo et al. | 345/302 |
| 5,504,917 | 4/1996 | Austin | 395/800 |
| 5,511,002 | 4/1996 | Milne et al. | 395/311 |
| 5,574,911 | 11/1996 | D'Angelo et al. | 707/1 |
| 5,600,845 | 2/1997 | Gilson | 395/800.39 |
| 5,603,058 | 2/1997 | Belknap et al. | 395/855 |
| 5,619,733 | 4/1997 | Noe et al. | 395/881 |
| 5,642,363 | 6/1997 | Smith | 371/22.34 |
| 5,642,477 | 6/1997 | De Carmo et al. | 345/302 |
| 5,664,226 | 9/1997 | Czako et al. | 395/872 |
| 5,680,592 | 10/1997 | Priem | 395/527 |
| 5,734,369 | 3/1998 | Priem et al. | 345/155 |

*Primary Examiner*—Thomas C. Lee
*Assistant Examiner*—Albert Wang
*Attorney, Agent, or Firm*—Stephen L. King

[57] ABSTRACT

A method of controlling the routing of input/output operations including providing a series of commands expressing connections between sources of data, processing elements, and destinations for data to carry out an input/output operation; compiling a data structure for the input/output operation from the series of commands, the data structure including context defining connections between each of the sources of data, processing elements, and destinations for data; and using the data structure to set connecting context to make connection expressed between each of the sources of data, processing elements, and destinations for data whenever the input/output operation is to be accomplished.

7 Claims, 11 Drawing Sheets

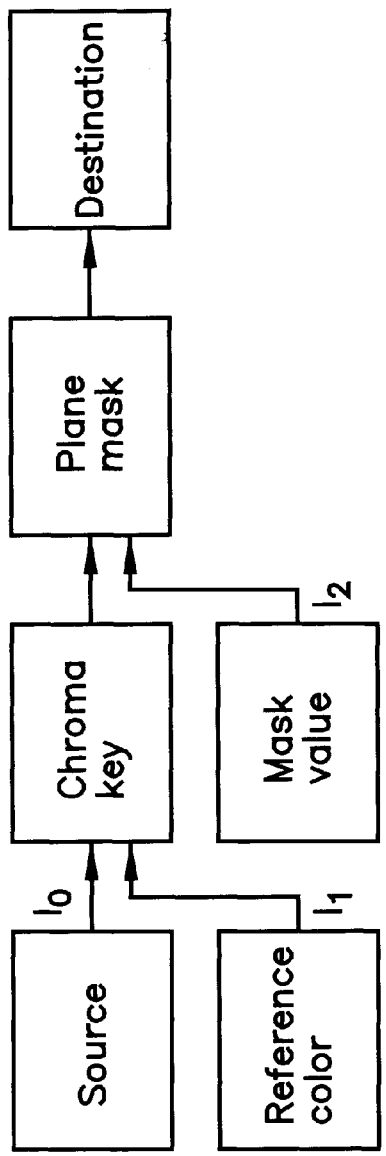
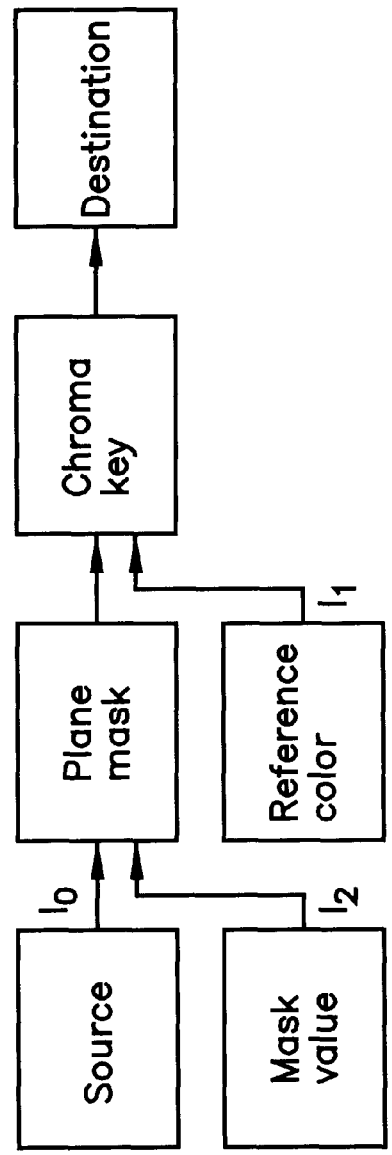
Figure 1a
Figure 1b

METHOD OF CONTROLLING I/O ROUTING BY SETTING CONNECTING CONTEXT FOR UTILIZING I/O PROCESSING ELEMENTS WITHIN A COMPUTER SYSTEM TO PRODUCE MULTIMEDIA EFFECTS

This application is a continuation of application Ser. No. 08/441,083, filed May 15, 1995, now abandoned.

BACKGROUND OF THE INVENTION

1. Field of the Invention

This invention relates to computer systems and, more particularly, to the control of the data to, from, and between input/output devices in a new input/output architecture for computer systems.

2. History of the Prior Art

The input/output device interfaces of existing computer systems are adapted to perform input operations in which data flows from an input/output device via the interface to either the central processing unit (for programmed input operations) or system memory (for DMA input operations), or output operations in which data flows from either the central processing unit (for programmed output operations) or system memory (for DMA output operations) via the interface to the input/output device. There is no need for routing information to direct the data flow since the start point (the central processing unit or a range of DMA addresses) is explicit and the end point is implicit since most device interfaces drive a single device with only one possible route.

Data flows only when and if a command requests it; there are no autonomous flows of data. The command provides a direction and names one single device as all the routing information necessary.

The advent of multimedia means that in addition to performing input and output operations, computers need to be able to perform operations in which data flows from one input/output device to another. For example, ideally when playing an audio compact disk (CD) on a computer, data should flow from the compact disk drive to the audio input/output device of the computer to be converted into sound. In practice, the compact disk drive converts the digital data to analog audio data; the analog audio data then flows via a special cable to be mixed with the analog output of the audio device of the computer downstream from the digital-to-analog converters. In fact, even if digital audio data were available from the compact disk drive, a conventional system would have to read it into memory and, as a separate operation, write the data from memory to the audio device. The digital data in flowing from one input/output device to another would travel over the system bus twice, once to memory and once from it. Thus, two complete bus operations rather than a single operation in which data travels between input/output devices would be required.

The advent of multimedia computers creates a need for a more powerful input/output architecture. In particular, it requires the ability to route data more flexibly including between input/output devices, the ability to control isochronous flows of data (make data flow at a particular continuous rate until commanded to stop), and the ability to interpose processing elements on flows of data (e.g., mix two streams of data together).

Operations in which data is transferred from one input/output device to another require complex routing information. For example, a system playing a Motion Picture Experts Group (MPEG) encoded movie from a compact disk might route the MPEG data from the compact disk via a SCSI bus to an MPEG decoder device, decode the MPEG data into a first stream of audio MPEG data and a second stream of video MPEG data. The first stream of decompressed MPEG audio data is sent to an audio mixer device where it is combined with other audio streams, and the stream of mixed audio data is routed via an audio digital-to-analog converter (DAC) to a pair of headphones. The second stream of decompressed MPEG video data is routed via a rendering engine into a specified region of a frame buffer where it is mixed with other graphics images. The video output of the frame buffer is routed via a DAC to a monitor.

In this example, there are one source device (the CD drive), two destination devices (the headphones and the monitor), and a number of intermediate processing devices (the MPEG decoder, the audio mixer, the rendering engine, the frame buffer, and the audio and video DACs). The source device has a single output and no inputs. Each destination device has a single input and no outputs. Each intermediate device has one or more inputs and one or more outputs.

Prior art computer systems provide an ad hoc set of connections among their resources. The special analog audio cable connecting the CD drive to the analog output of the audio device of the computer is one such ad hoc connection. An application wishing to route audio data from the CD drive to the audio output of the computer has to be aware of the existence of the special cable in this particular configuration and of the specific manipulations of the hardware needed to cause data to flow via the cable. There is no general device-independent way to enumerate the available sources, destinations, and intermediate processing elements, nor is there any general way to establish or remove connections between them.

This contrasts with practices in the audio industry which has long provided studios in which sources of audio data, modulating elements such as vibrato and tremolo units, mixers and limiters, and audio outputs are represented as individual modules which a human operator may connect in appropriate configurations using physical wires called patchcords.

It is desirable to provide computer application programs with the ability to identify the available sources, destinations, and intermediate processing devices available in a particular configuration and to allow application programs to route data among these resources as best fits their needs, subject to the constraints of the underlying hardware, in ways analogous to the physical patchcords of an audio studio.

Nor does the prior art provide general techniques by which multiple application programs may share a collection of sources, destinations, and intermediate processing elements. Each of a group of application programs running simultaneously using the collection of input/output elements wants to establish its own set of connections between these resources and to establish its own context on each of the resources. Context as used herein refers to the conditions such as register states, switch enables, and the like necessary for any resource to function correctly with the application program.

In conventional input/output systems, an application sharing access to an input/output resource needs to have context on that resource only while the application is actually accessing it. At other times, some other application may be using the resource and placing its own context on the resource. Input/output resources are serially reused by the group of application programs sharing them, providing each application with the illusion of exclusive access.

If a group of application programs share access to a pool of input/output resources that support autonomous isochronous data flows, the resources can, in general, no longer be serially reused. Consider an MPEG satellite television application and a videophone application running together on a single computer and sharing a pool of input/output resources. Initially, the MPEG broadcast is playing and the videophone is idle. The video frames of the broadcast are being rendered into a region of the framebuffer, and the audio samples are being routed to the speakers. A videophone call is received. The system reduces the volume of the satellite broadcast, decreases the size of the broadcast image, creates a window and starts rendering video frames from the videophone into it, connects the audio output of the videophone to the mixer, and increases its volume until it is easily audible.

In such a case, the two applications are truly sharing the audio output rather than serially reusing it. During each audio sample interval, the mixer receives a sample from the satellite and a sample from the videophone, multiplies them by their fader values, adds them together and normalizes the result to the desired overall volume.

It is desirable to allow each application to construct the set of input/output resources it requires, to specify appropriate connections between those resources, and to place appropriate context on them independently of what other applications are doing with the same set of resources. It is also desirable for the underlying system to manage the serial reuse and true sharing implied by the configurations constructed by the applications.

SUMMARY OF THE INVENTION

It is, therefore, an object of the present invention to provide apparatus and a method to allow programmers of computer applications to establish data flows among the input/output resources available to suit the needs of the applications and to control those flows.

It is another object of the present invention to allow controlled sharing of such input/output resources among several simultaneous such applications.

It is another object of the present invention to provide apparatus and a method to allow application programs to select the routing of data streams through various processing elements from sources of data to destinations for that data by which all input/output operations are be accomplished and to allow that routing to be easily modified.

These and other objects of the present invention are realized in an arrangement in which both the input/output resources and the connections between them are represented as data structures each of which is an instance of a class. Each data structure for an input/output resource carries context for a particular application program, and this context may be initialized and modified by modifying the data structure. Among the modifications provided by the data structures representing input/output resources are those which the application to connect data structures representing connections to the inputs and outputs of the resources. A data flow is established when a chain of alternating input/output resource data structures and connection data structures extends from a source data structure to a destination data structure.

These and other objects and features of the invention will be better understood by reference to the detailed description which follows taken together with the drawings in which like elements are referred to by like designations throughout the several views.

BRIEF DESCRIPTION OF THE DRAWINGS

FIGS. 1(a) and 1(b) are illustrations of different orders in which input/output operations may be accomplished.

Notation and Nomenclature

Figure 2:
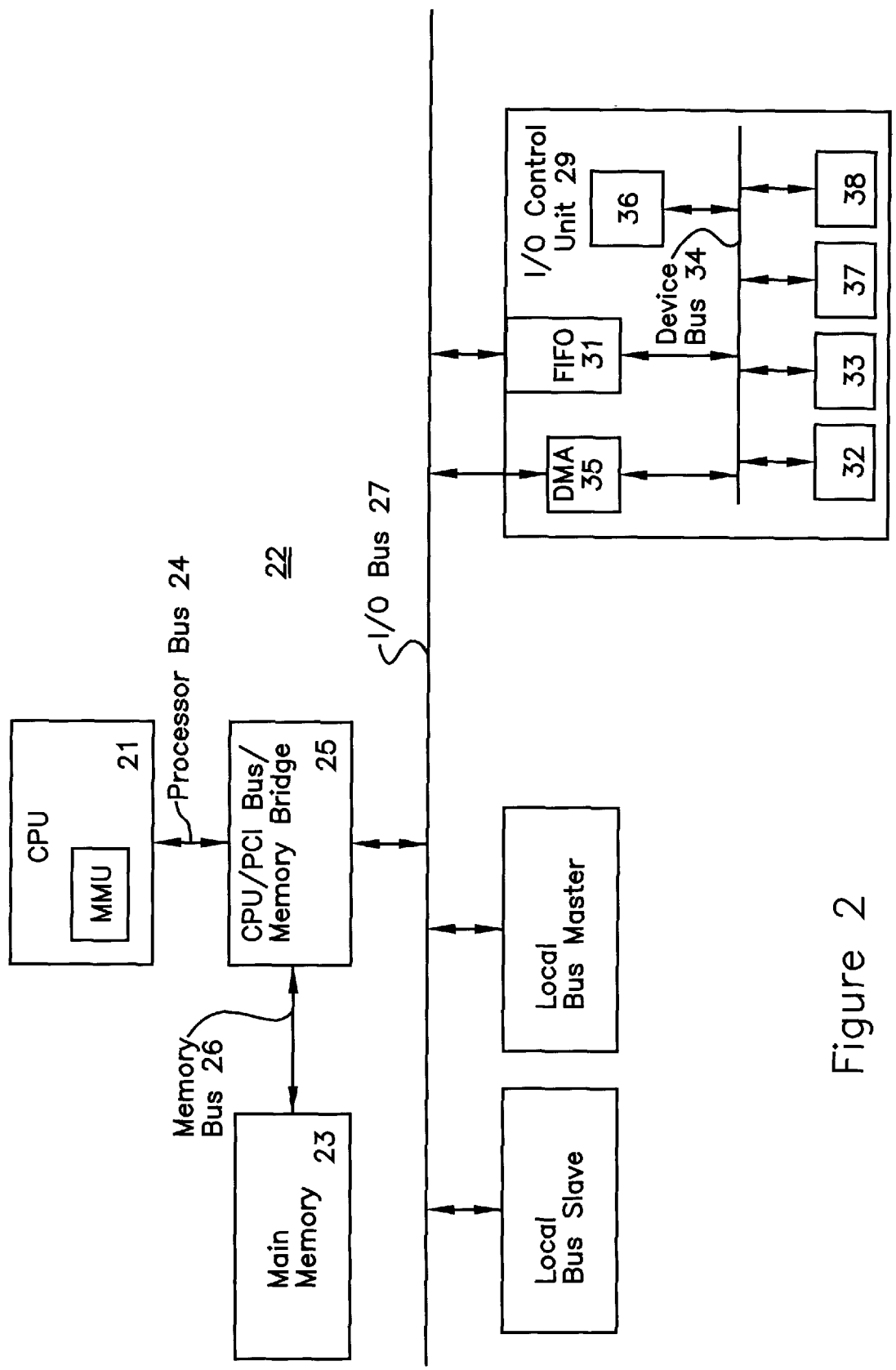
FIG. 2 is a block diagram of a computer system utilizing the architecture of the present invention.

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

DETAILED DESCRIPTION

As pointed out above, the advent of multimedia means that in addition to performing input and output operations, computers should be able to perform operations in which data flows from one input/output device to another. To date, there is no overall approach for performing these operations, only a series of ad hoc approaches. For example, designers of particular input/output devices such as graphics controllers have provided hardwired circuit pipelines connecting the individual processing elements which accomplish the various individual functions within that device. The different parts of the graphics controller are provided with switches such as gates which enable or disable the particular circuitry for the particular operation to allow particular sets of operations to be accomplished with the fixed pipelines. Thus, a particular operation may be included with or excluded from a predetermined sequence of operations by enabling the particular circuitry accomplishing that operation in the hardware pipeline.

One problem with this approach is that a fixed pipeline offers an applications programmer a single choice of the route by which the processes may be accomplished. In many cases, transferring data by one route through a set of processing operations produces a different result than transferring data by a different route through the same operations. Often, the routing which the hardware designer chooses for the individual operations in the pipeline is inappropriate to the result the applications programmer desires to accomplish.

For example, FIGS. 1(a) and 1(b) illustrate two sequences each of which includes the same individual processing elements. In a first case, data representing an image lo is transferred through a chromakey process where it is combined with data representing another image $I_1$ and the result is passed through a plane mask operation where it is combined with data representing another image $I_2$. In the second case, data representing the image $I_0$ is first passed through a plane mask operation where it is combined with data representing the image $I_2$; and the result is passed through a chromakey process in which it is combined with data representing the image $I_1$.

A chromakey operation forces the alpha component of its resulting image to zero wherever its two input images match. This is used, for example, to superimpose a weatherperson on a weather map. The weather person is photographed against a blue screen and this image $I_0$ is chromakeyed against an image $I_1$ which is blue everywhere. The resulting image has alpha zero except where the weatherperson obscures the blue screen. The resulting image can be blended with an image of the weather map; those pixels in the map for which the alpha of the result of the chromakey operation is zero will appear in the result of the blend unchanged, while those pixels representing the weatherperson (which will have non-zero alpha) will replace the corresponding pixels in the weather map. The effect will be of a weatherperson standing in front of a weather map.

Thus, in the first case discussed above, the overall resulting image will have zero alpha where the images $I_0$ and $I_1$ match. In the second case, the overall resulting image will have alpha zero where the image $I_1$ matches the result of planemasking images $I_0$ and $I_2$. Unless the pixels of image $I_2$ are all ones, the results will be different in the two cases.

The present invention is directed to apparatus and a method by which an application program running on a computer system may specify the route which data is to take as it flows from a source of data to a destination for that data (possibly via some intermediate processing elements) as a result of input/output operations requested by the application program.

In accordance with the invention, the specification of a route for data takes place in what are described herein as four phases (although the grouping is entirely arbitrary). In the first phase, data structures representing each input/output resource involved in the route and each connection between the input/output resources are created and named. The data structures representing connections are referred herein to as "patchcords." In the second phase, each connection in the route is established by indicating an appropriate input connection in the data structure that represents the processing element which is to be the origin of data for each patchcord and an appropriate output connection in the data structure that represents the processing element which is to be the recipient of data from each patchcord. In each case the indication includes the name of the patchcord connected to that processing element. In the third phase, the context of each processing element in the route is initialized with appropriate state by an indication of the context being stored in the data structure representing the processing element. These first three phases do not effect any physical changes in the routing hardware but simply construct a map of the desired routing. A fourth phase occurs when the application program requests data to be transferred via the route that has been constructed. In this final phase, the map is transformed into appropriate state for the routing hardware; and this state, together with the context for the application for each of the resources involved, is provided to the hardware.

At least two possible embodiments of the fourth phase are possible. In one embodiment, the input/output resources are connected together using what is effectively a crossbar switch, a switch capable of connecting any output of a resource to any input of another resource. In another embodiment, the input/output resources are connected together using a static pipeline with enable bits and remapping hardware used to control the operation of the input/output resources. It should noted that an application program would not be aware of which embodiment was in use.

The present invention provides a new approach to handling the sequences of input/output operations which are to occur and utilizes hardware which responds to applications utilizing this new approach. The new method allows the sequence of operations which are desired to be selected by the applications programmer.

Utilizing this method, the application provides the desired sequence of operations to be carried out and lets the system provide the various signals for enabling and disabling the paths necessary to make these connections. The commands of the method designate the manner in which the operations are to be connected together to provide a correct result instead of simply providing the commands which open and close paths, paths which may change between various types of hardware. This allows the hardware to be changed yet respond to provide the same sequence of operations. Similarly, this allows an application program to be more easily ported to another system which is cognizant of the command structure because the commands direct the hardware in the sequence necessary to provide the correct results.

Figure 8:
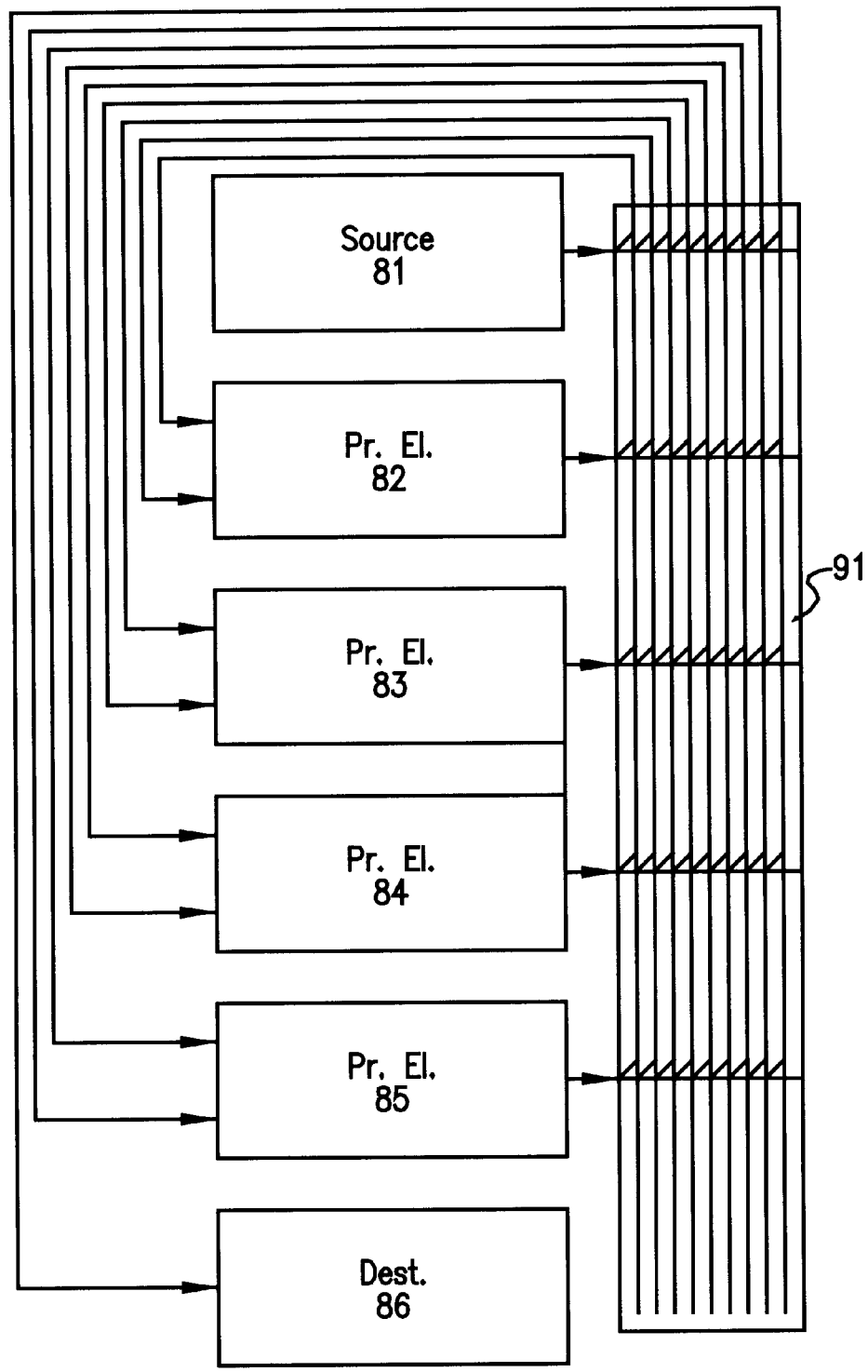
FIG. 8 is a block diagram of one embodiment of circuitry for carrying out the present invention.
Figure 9:
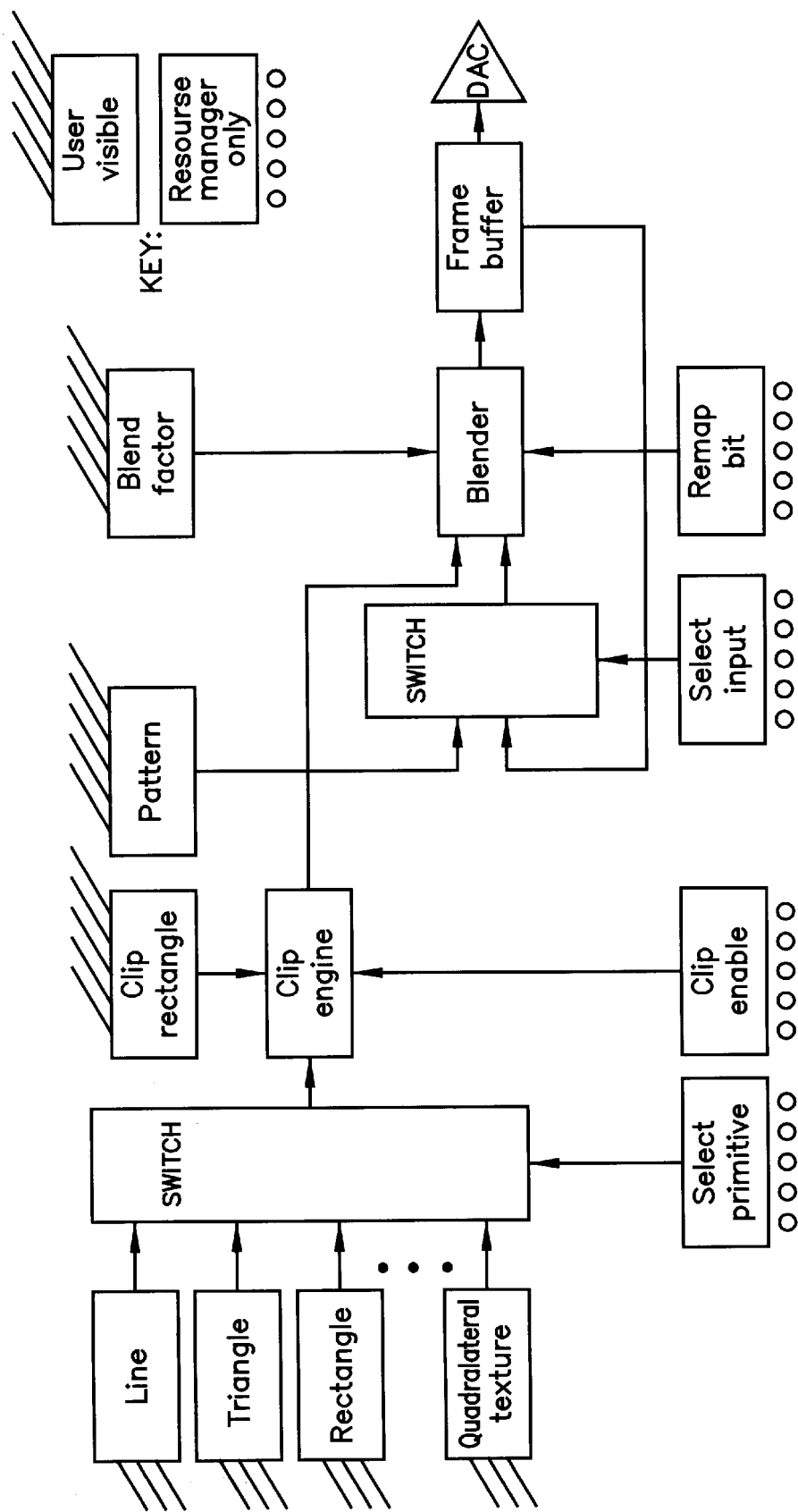
FIG. 9 is a block diagram of another embodiment of circuitry for carrying out the present invention.

As pointed out, there are different manners in which the invention may be implemented. A first method of implementing the invention provides circuitry which allows the construction of a variable pipeline in which connections between any appropriate operational modules (sources, processing elements, and destinations) may be made. This form of hardware uses switches (essentially crossbar switches) able to connect any module to any other module to produce a pipeline. With such hardware, data structures set up by the command language designating the connections to be made simply cause the hardware to close the switches connecting the operational modules to produce the correct routing for the desired pipeline. FIG. 8 illustrates an circuit arrangement including a series of operating modules (including a source of data, processing elements, and a destination for data) 81–86 for accomplishing the particular processing functions. Each of the operating modules is associated with a switch 91 for providing the particular connections desired in order to accomplish the manipulation of data in the desired order. As may be seen in FIG. 8, the switch 91 can connect any output of the source and any processing element to any input of any other processing element or the destination so that the pipeline may be constructed with elements in any order desired by the applications programmer. A programmer may specify "connect A to B to C" or "connect A to C to B" or any other order.

In order to function with such an arrangement, the method of operation must include means for instructing the hardware which connects the individual operational modules of the particular routing for the operations desired. Then, the hardware implements each of these connections by carrying out the enables and disables (closing and opening the appropriate switches) necessary to connect the pipeline in the desired manner.

The problem of accomplishing these results is complicated by the fact that each individual processing element may require specific context changes in order to function with the particular application program to accomplish the particular operation. For example, a color lookup table involved in providing an output to the display may require a particular value setting for a particular application; the output of a particular operation may have to be clipped to fit in a particular window. On the other hand, each of these elements may require different values to function with other application programs or other operations for the same application program. Consequently, these elements of context for the individual processing elements and the context which comprises the various enables to close the switches to form the processing pipeline can only be made when the pipeline is ready to be used. One way in which the context for the individual elements and for the pipeline to accomplish these operations can be changed as they are needed is to create data structures representing the context for the particular processing elements and the correct context for establishing the pipelines when the pipeline is implemented, and then use these data structures to effect the context changes necessary just before the operation commences.

Figure 10A:
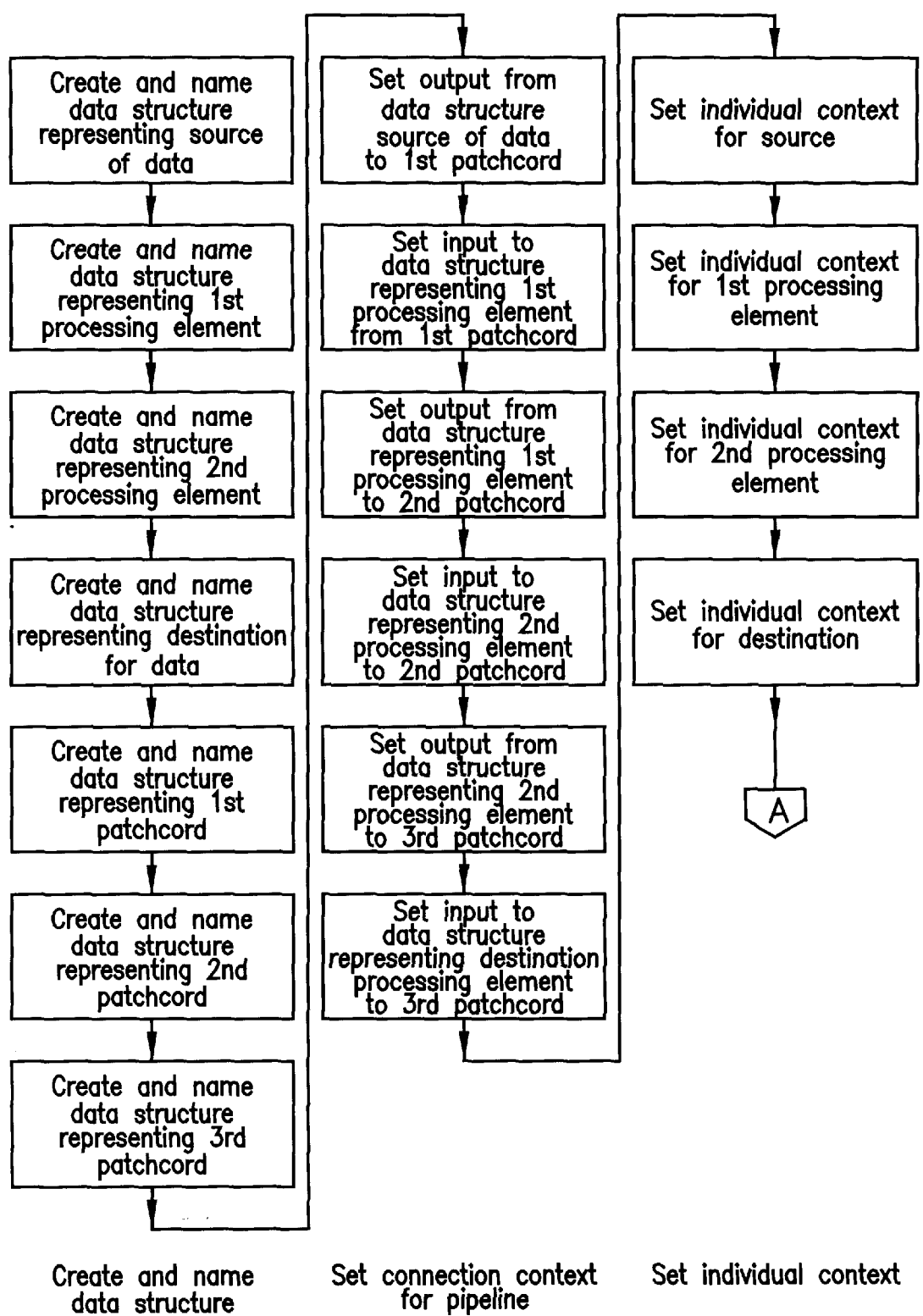
FIG. 10 is a flow chart of a method in accordance with the present invention.
Figure 10B:
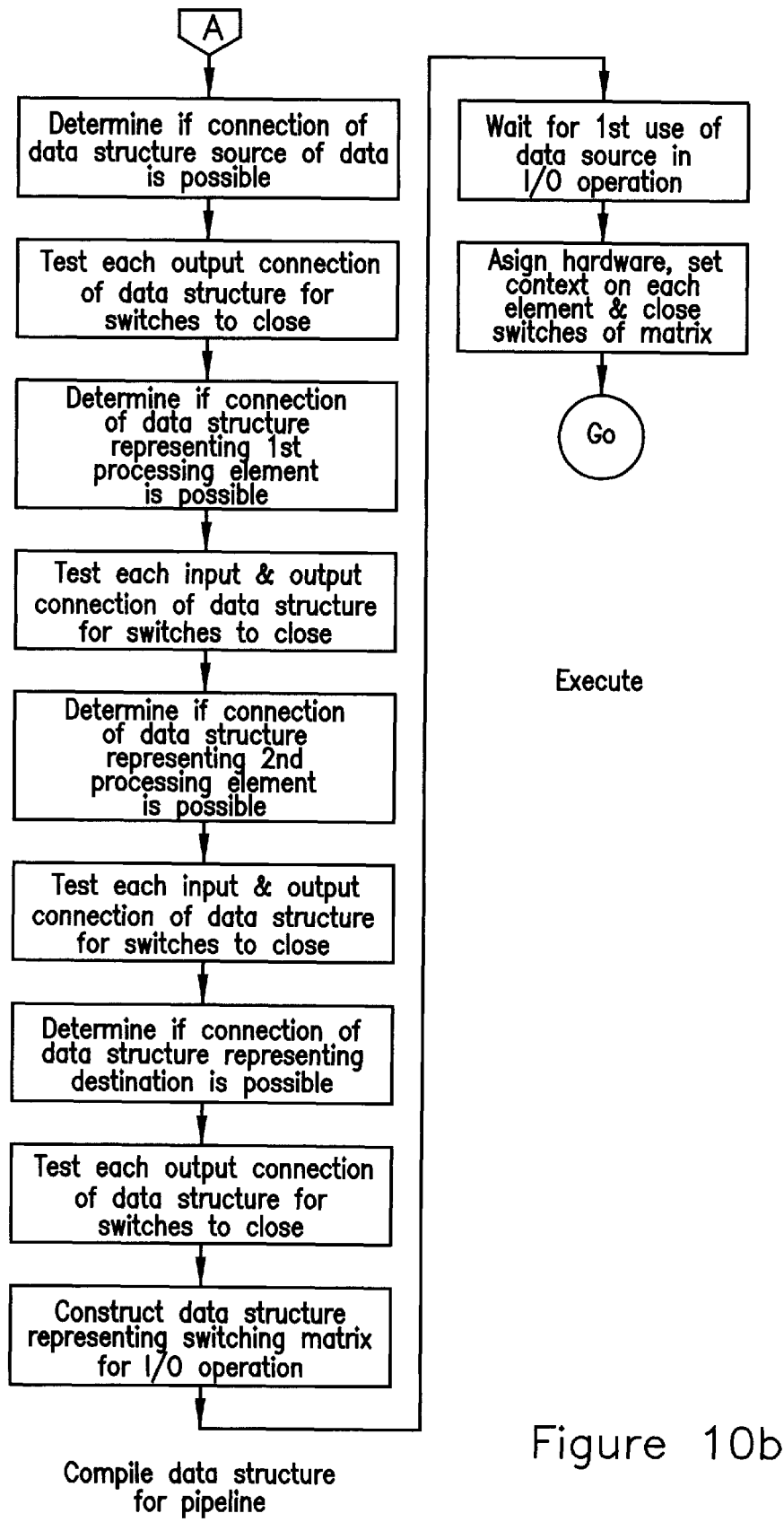

FIG. 10 is a flow chart illustrating a method in accordance with the present invention by which the present invention may be practiced. As may be seen in FIG. 10, in a first general step data structures are created for each of the operational modules (sources, processing elements, destinations) which are to be used in the operation. Each of these data structures includes data from which the context to be placed on the operational module may be determined. During this same operation of creation of data structures, a data structure is created for each individual link between one operational module and the next module. These linking data structures are referred to as patchcords in this specification.

Thus, in FIG. 10, a data structure is first created and named to represent the original source of the data in the particular operation. A data structure is next created to represent a first processing element which will operate on the data in the particular operation. Additional data structures are then created to represent any additional processing elements which will operate on the data in the particular operation. Finally, a data structure is created to represent the destination for the data such as a frame buffer. In addition, patchcord data structures are created to represent the connections between the source of data, any processing elements which will operate on the data, and the destination for the data.

It should be noted that the particular order in which each of these data structures is created is not important to the invention so long as all of the necessary data structures has been created before the pipeline for the data is to be used. Thus, as will be seen from the detailed description which follows, certain of these data structures will already exist in particular embodiments having been created for other uses in the computer system.

After the individual data structures representing the individual elements of the pipeline have been created, the connections which form the route for the input/output operation from source to destination are established. This is accomplished by providing the individual structures context related to the pipeline which is being formed. In order to accomplish this, the individual data structures representing each of the source of data, the processing elements in the pipeline, and the destination for the data are furnished the data representing the context of the connections being made. In a particular embodiment which will be discussed below, each of the data structures for a source of data, each processing element, and each destination for data is furnished a designation of the connection of that element to any patchcord. Depending upon the particular implementation of the invention, each of the patchcord data structures may be furnished the context indicating the processing elements to which it must connect in order to function in the particular operation in order to implement the desired connection.

It is useful to create a data structure representing the pipeline in total. In one embodiment of the invention, the creation of a patchcord creates a position in a connection table for that patchcord. When a data structure representing a source, processing element, or destination receives data to define the patchcord to which it is connected, the input or output port of the switch connected to the element which the data structure defines is placed in one portion of that position in the table. Thus the table will contain the switch positions to be enabled to create the defined pipeline. As each processing element receives this initialization, the context representing the switches which are to be closed or opened to include the particular element in the pipeline are included in the data structure for the pipeline. Gradually, a data structure representing the entire pipeline is built. An operating system process is run which tests each processing element in the pipeline by starting at the source of the data and continuing through each connection to the destination. As each element is tested, a determination may be made whether that element may be included in the particular pipeline. For example, if the pipeline is to handle video data, then audio elements cannot be included in such a pipeline; and an error signal would be generated. As another example, if some portion of the pipeline is being used at a previous position in the same pipeline, it could probably not be included in the same pipeline a second time; and an error signal would be generated.

In addition to defining the pipeline in the manner describes above, context defining the manner in which each of the source, processing elements, and destination functions in the particular operation with the particular application program is furnished to each of the data structures defining each of these individual elements. Thus the color format and particular colors to be used in a processing operation may be furnished to the element to which the context applies.

Although this furnishing of context related to the individual processing elements is shown as occurring in the third phase of the process, it may occur at any time after any particular data structure has been created and named.

Once the data structure representing the pipeline has been constructed and tested, the pipeline may be enabled on the first occasion for data to flow from the source of data through the pipeline. The pipeline is enabled in one embodiment by compiling the data structure for the pipeline into a connection table for enabling the switch 91 of FIG. 8. Depending on the particular algorithm utilized, the enabling may continue in one embodiment by comparing the compiled pipeline with the existing resources and connections available in the hardware rather than doing that comparing during the earlier initialization step. If they are compatible, the resources are assigned, context is provided from each of the data structures to the processing elements, the connections are made, and data may then flow. If the resources and connections available in the hardware are not compatible with the existing hardware, an error is generated.

Figure 11:
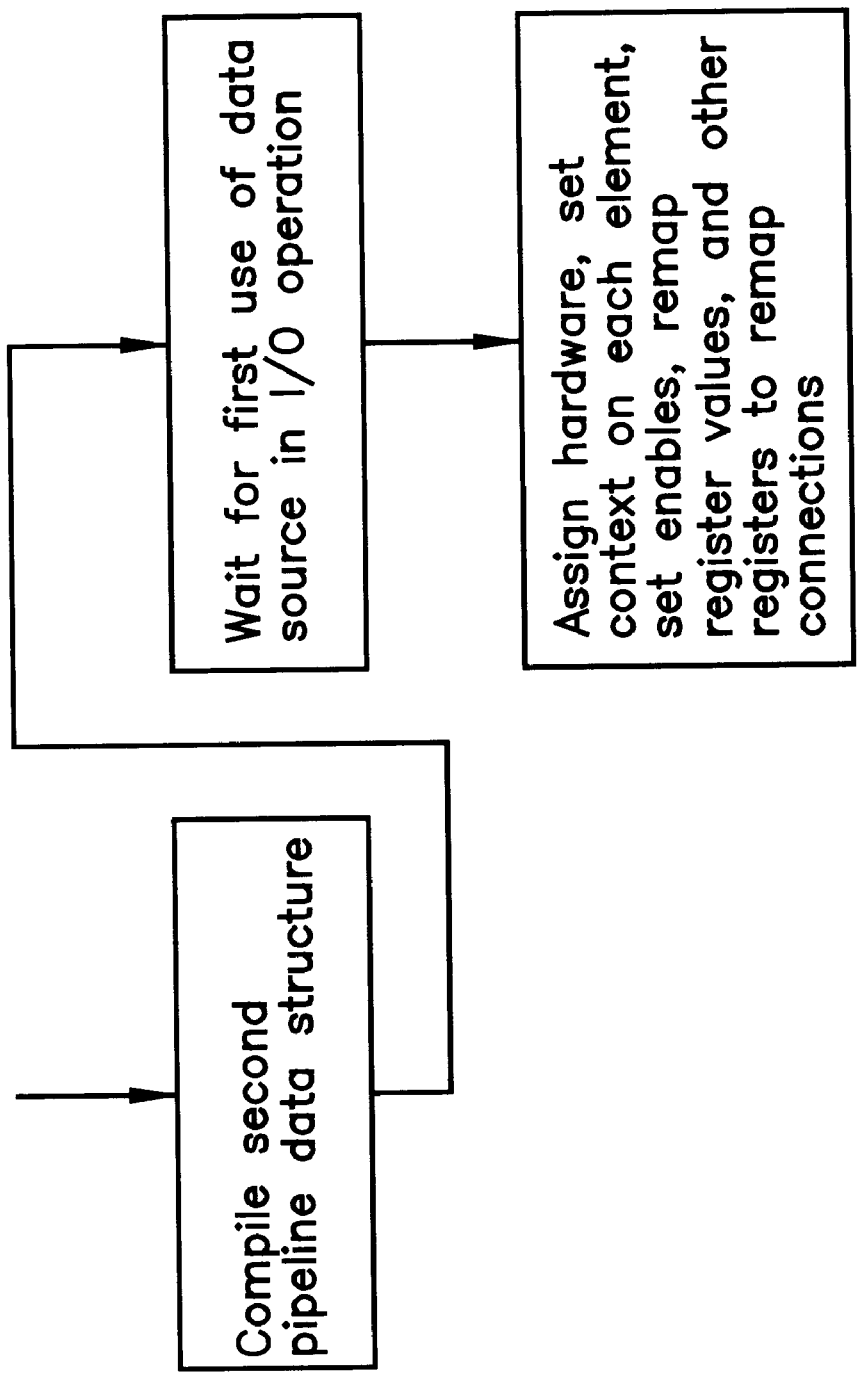
FIG. 11 is a flow chart of a second embodiment of a method in accordance with the present invention.

Another embodiment of the method may be used with systems designed in accordance with the prior art which provide a fixed pipeline of input/output operations. The details of this second embodiment which vary from FIG. 10 are outlined in detail in FIG. 11. In this embodiment, the input/output device is provided with a fixed pipeline of processing elements as used in the prior art in which different enabling signals must be provided to include the individual processing elements in the hardware pipeline.

The details of the initial steps of the method are identical to those of the embodiment described above. That is, each of the elements of the processing pipeline beginning with the source and ending with the destination must have been created and named and each of the patchcord data structures to connect those processing elements must have been created and named.

As with the first embodiment of the method, the next general operation is to designate the connection of each patchcord at each end to the source of data, to one of the processing elements, or to the destination for data by indicating the connection as a specific input or a specific output connection to each element of the pipeline. This is accomplished by indicating the connection to a particular named patchcord at one of the input or output terminals of the source, processing element, or destination in the data structure representing that individual element of hardware. In this embodiment of the invention, designating these connections creates a graphical mapping of the entire pipeline which is stored as a first pipeline data structure.

For each processing element in the simplest case of practicing this embodiment of the invention, a table is kept of those enables and register values required to make each connection for the processing element. When the pipeline is completed, the data structure including the graphical mapping is compiled into a second pipeline data structure by consulting this table of enables so that the connections of the first data structure are replaced by the various enable signals and register settings required to produce the connections in the second data structure. The second data structure thus defines all of the enables, register values, and the like for completing the pipeline. In order to compile this second data structure, the connections which are possible with the hardwired pipeline are tested and error indications are generated in the manner described above if a particular pipeline cannot be implemented.

The steps continue in the same order once the second pipeline data structure has been compiled. Context is furnished each individual data structure representing a source, processing element, and a destination. The pipeline is ultimately enabled when the first use of the pipeline is made in the same manner as with the earlier embodiment. Thus, the result of using the second embodiment is the same as with the first and the same useful results obtain. It will be noted, however, that since the physical order of the processing elements is fixed in this second embodiment, it may not be possible to realize all of the possible arrangements which can be realized with the first embodiment.

The second embodiment of the invention may be greatly enhanced to eliminate many of the problems created in the prior art by a fixed connection pipeline. It has been discovered that many of the operations of the fixed pipeline may be modified to produced a desired result even though the order of the appearance of the operating elements is incorrect in the pipeline. For example, blending circuitry which combines two images in relation to a blend factor will produce a correct result if the two inputs to the blend circuitry appear at the correct input terminals and a correct blend factor is used. However, if the inputs appear at the opposite terminals, then the result will be incorrect. It is still possible with this fixed circuitry to obtain a correct result if the input has hardware to switch the inputs or if the blend factor may be modified to apply to the opposite input terminals of the blend circuitry. It is possible to do either, but simpler to change the blend factor to a value equal to one minus the original blend factor. This may be accomplished by keeping a table of the possible connections to the blend table and the enables and register settings to be used to provide the blend factor (B or (1−B)) for the connection desired. This table is then used when the graphical mapping of the first pipeline data structure is compiled to produce the second pipeline data structure. As the second data structure is compiled, the table is consulted for each connection specified by the patchcord connections in the graphical mapping to determine the appropriate enables to select and register values to supply. In one embodiment, a one bit remapping register is included as a part of the blender circuitry. If the bit is set to one state, a normal blend factor is used; while if the bit is in another state, one minus the blend factor is used. the setting of the bit in the remapping register depends on the connections specified by the first pipeline data structure.

Similarly, other processing elements may be modified in a like manner to provided a result suited to the position of the processing element in the fixed pipeline. For example, consider a rasterop engine that combines three inputs under control of a rasterop code supplied by an application program. There are six possible permutations of the three inputs that the application might specify. The hardware could adapt to these six possible input arrangements by providing a three-way switch for each of the input patchcords that could route the input to any of the three rasterop inputs. Alternatively, the hardware could connect each input patchcord to a fixed one of the three rasterop inputs and provide a remapping register. The remapping register in such a case has six possible values; each value selects a table that systematically changes the rasterop code supplied by the application program into a hardware rasterop code that achieves the result that would have been achieved with the connection pattern and rasterop code supplied by the application, correcting the difference between the actual connection pattern and that specified by the application.

As with the previous embodiment of the method, the same useful results obtain from this second method of implementing the invention. Because the method of operation instructs the hardware of the particular order in which operations are desired and the hardware, in general, provides a means for implementing each of these connections by carrying out the enables and disables and furnishing register values and remapping register values necessary to connect the pipeline in the desired manner, the method may be implemented over a wide range of hardware. If a particular operational order is not possible because of the fixed nature of the pipeline, then the hardware must indicate that the operation is not possible. In such cases, the operation will typically be emulated in operating system software rather than by the hardware pipeline provided.

By utilizing a method which defines the manner in which the operational components are to be connected to one another, the present invention allows an application program to designate the routing through the individual input/output resources in a pipeline that processes data being transferred from a source to a destination. The present invention allows a simple form of high level programming to be used to accomplish sequencing of the operations. Essentially, for each operation to be accomplished, the application program specifies the device which is to provide the data to be transferred, the device which is to receive the data, and provides a link or patchcord by which the data is to be carried. The specification of the link by which the data is to be carried generates a software path which in use is translated into context to be placed on all of the units of an input/output device to create the pipeline by which the operations are implemented in the proper order. Thus, the application program has complete control over the routing through the individual processing elements by designating the specific connections of processing elements which are to be made. On the other hand, the details that specify which switches to close, which enables to provide, and the register values to be provided in order to connect the path selected are programmed by the systems programmer who originates the driver for the graphics engine or the audio engine rather than by the individual programmer who is trying to get his application program to function with a particular graphics controller. This makes the programming function much easier.

The apparatus and method are such that they may be implemented with variations across a broad range of computer systems. However, the apparatus and method have been implemented in a new input/output architecture. In order to understand the operation of the present invention in the context of a new input/output architecture, it is necessary to understand the details and operation of the new architecture.

Overview of the New Architecture:

Modern computer system are typically based on an architecture which was first offered in the Digital Equipment Corporation (DEC) PDP11 computer. One problem with this architecture as with earlier IBM and CDC mainframe architectures is that writing directly to the input/output devices of the system by an application program is prohibited. Although this architecture allows all of the facilities of the central processing unit to be used for input/output, it requires that the operating system running on the central processing unit attend to all of the input/output functions using trusted code. This significantly slows any input/output operation of the computer.

In contrast to earlier mainframe systems, in the PDP11 architecture, there is no process by which the input/output performance of the system can be increased except by increasing the speed of the central processing unit or the input/output bus. This is an especial problem for programs which make heavy use of input output/devices such as video and game programs which manipulate graphics and high quality sound extensively.

The new input/output architecture has been devised to overcome problems of the prior art. This new input/output architecture cooperates with other components of existing systems based on the PDP11 input/output architecture, yet is able to drastically increase the speed of input/output operations for new application programs. In order to accomplish this, the new architecture allows read and write operations by application programs to be made directly to the input/output devices. This eliminates the cumbersome multi-step software processes invoked by prior art systems using the operating system and trusted code for every input/output access. In order to accomplish the process safely, the new input/output architecture of the present invention utilizes an input/output control unit which first provides its own virtual name-to-physical-device address translation for all of the input/output devices associated with the new input/output control unit on its own internal device bus. As a part of this translation, the input/output control unit assures that the correct context is present for an input/output device to function with an application program before a first access is allowed. This allows application programs to write directly to input/output devices on the device bus associated with the input/output control unit without affecting assets of other application programs. Once this translation from virtual names furnished by the application programs to physical input/output devices on the device bus is accomplished and context for the application has been furnished to the actual input/output device, translation of addresses of input/output devices on the input/output bus into physical addresses of those input/output devices on the device bus is carried out directly by hardware at the input/output control unit. This hardware also checks permissions; and, when an operation is known to be safe, it is performed by hardware. When a translation operation fails, the operating system software is invoked. Thus, rather than trapping every input/output operation to determine whether it is safe as is done in prior art computer systems based on the PDP11 architecture, the present invention traps and sends to operating system software only unsafe operations and allows hardware to accomplish most translations thereby greatly speeding the access of input/output devices.

The new input/output architecture has been designed so that it eliminates almost all operations which read registers of input/output devices. In order to accomplish this, the input/output control unit includes a first-in first-out (FIFO) unit for storing instructions directed to the input/output control unit. The FIFO unit queues incoming write operations; but, unlike FIFO units used in prior art systems, it stores both addresses and data. This allows the write operations to the input/output control unit to occur asynchronously.

To help maintain this asynchronous operating arrangement and to eliminate read operations to the greatest extent possible, the input/output control unit also includes an advanced direct memory access (DMA) device to assist data transfers involving input/output devices associated with the input/output control unit. The DMA device allows the results of input/output operations to be written by input/output devices to main memory rather than requiring read operations by the central processing unit to obtain these results as in prior art systems. This eliminates almost all need for the central processing unit to read input/output devices and drastically increases the overall speed of input/output operations.

In order to achieve all of these improvements, the present invention utilizes an architecture illustrated in block diagram in FIG. 2. As may be seen, although the input/output architecture may be used with systems utilizing a single input/output bus for all operations, the architecture functions as well in a system 22 utilizing a local bus 27 such as the Peripheral Component Interconnect (PCI) bus or the Video Electronics Standards Association (VESA) local bus which may be associated with other input/output buses. While the discussion of this particular figure will assume that the bus 27 is a PCI bus, the local bus 27 is also referred to in this specification as the input/output bus 27. In arrangements utilizing local buses, the central processing unit 21 and main memory 23 are typically arranged on a processor bus 24 and a memory bus 26, respectively, and are joined to a bridge unit 25. The central processing unit 21 typically includes a memory management unit such as that described above. The bridge unit 25 provides write buffering for operations between the central processing unit 21 and the input/output bus 27, between the central processing unit 21 and main memory 23 on the processor bus 24 and the memory bus 26, and between the input/output bus 27 and main memory 23.

In the new architecture, a single input/output control unit 29 is shown joined to the input/output bus 27. The control unit 29 includes a hardware FIFO unit 31 for receiving incoming commands addressed to the input/output devices on a device bus 34. In this embodiment of the invention, only a single FIFO unit 31 is used although a plurality of FIFO buffers might be used at greater expense in order to further accelerate operations. The unit 29 receives physical addresses on the input/output bus 27 furnished by the system memory management unit and virtual names furnished by application programs for operations to be performed at the FIFO unit 31 and controls the translation of those addresses and virtual names into physical addresses and context for all the associated input/output devices. The hardware unit 29 includes the device bus 34 to which the individual input/output devices such as a disk controller 32, a graphics output controller 33, and a sound generator 37 are shown joined. The unit 29 also includes a DMA unit 35 which is adapted to transfer data between the individual input/output devices and main memory for use by the central processing unit or other components of the system.

Figure 3:
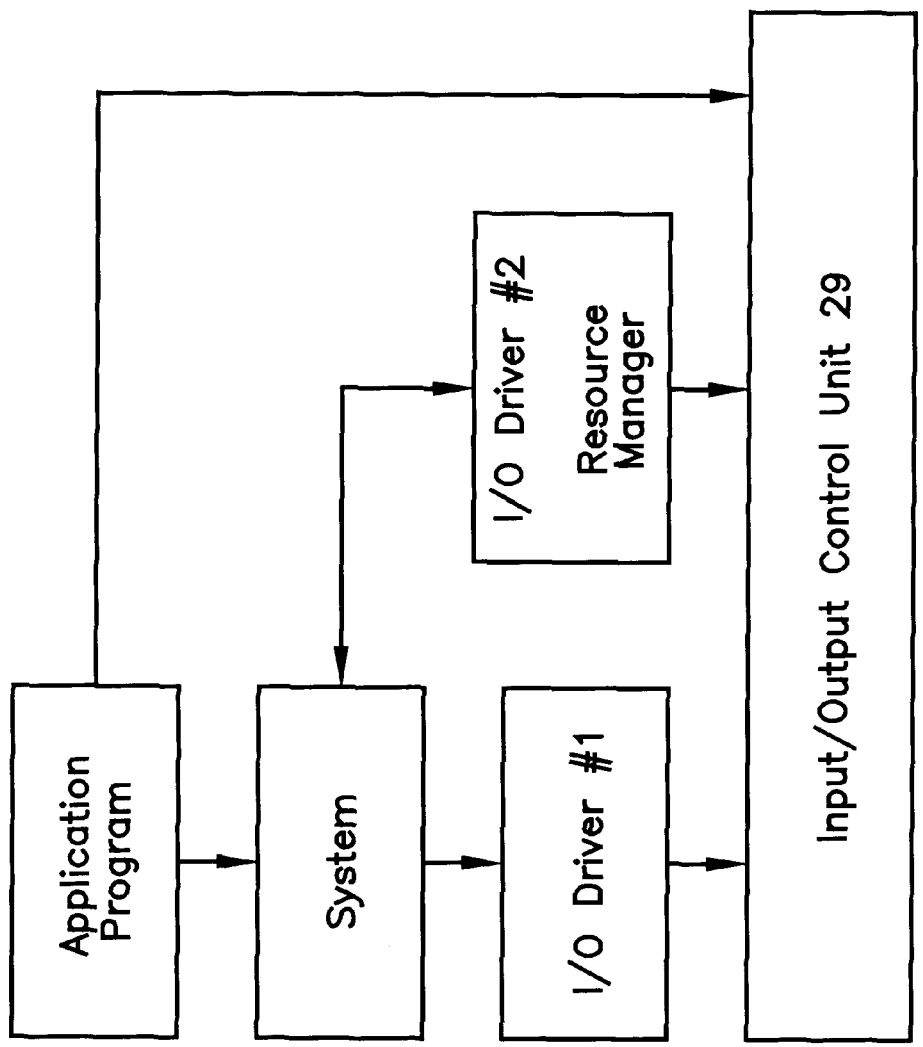
FIG. 3 in a diagram illustrating the operation of software in the architecture of the present invention.

The General Operation of the Input/Output Unit 29:

FIG. 3 illustrates the manner in which operations are conducted by software in the new architecture. An application program which utilizes the new architecture may issue a command requesting permission from the operating system to map certain of the physical addresses decoded by the input/output control unit 29 into the address space of the application program. The operating system, using a new I/O driver #1, allots some portion of the system physical addresses which the input/output control unit 29 is decoding to the particular application program address space for its use only and installs the virtual-to-physical input/output bus address translations for the application program in the memory management unit. In a typical computer system, the memory management unit stores translations for what are referred to as pages of memory. If the size of the portion of system physical addresses allotted to an application program is a multiple of the memory management unit page size, then the I/O driver #1 can use the memory management unit to ensure that no more than one application program may access each area.

Installing the appropriate translations in the memory management unit of the central processing unit 21 creates a path around the operating system by which the application program may read and write directly to the hardware of the input/output control unit 29. The application program then writes to these allotted input/output bus addresses providing as data a virtual name of its choice for an input/output device on the device bus 34. The input/output control unit 29 takes the input/output address and the virtual name and uses it to first create and then install a translation between input/output bus addresses and device bus addresses in its internal hardware and to place the context required by the application program in that input/output device. Once this has occurred and for so long as the application program continues to run, the application program writes commands which the memory management unit associated with the central processing unit translates to the physical addresses on the input/output bus 27 for the input/output control unit 29; and the input/output control unit 29 further translates the input/output bus addresses of the commands to physical addresses of input/output devices on the device bus 34. In this way, the application may write directly to the input/output unit in order to utilize an input/output device such as the graphics output controller 33 without requiring any software intervention by the operating system.

As will be understood from the more detailed description which follows, the use of many identically-sized input/output device address spaces each assigned for use only by one application program allows the input/output addresses to be utilized to determine which application program has initiated any particular input/output write operation.

Creation of a Safe Translation for an Input/Output Device:

When the code of an application program is written to take advantage of the new architecture, a safe translation for an input/output operation utilizing a physical input/output device must first be created. A safe translation for an application to utilize an input/output device requires not only a correct physical address for the device but also correct context so that the device will function appropriately with the device. An application program may utilize the same input/output device for different purposes each requiring different context. To create such a safe translation, the application program sends a first special calling command adapted to call an input/output device to the input/output control unit 29; this special calling command includes as data a predefined name such as "LINE_DRAWER" selected in accordance with a prescribed naming convention. The command is transferred directly to the FIFO unit 31 where it is placed in the FIFO queue. When this special calling command reaches the bottom of the FIFO unit 31, no translation between this virtual name (e.g., LINE_DRAWER) and a physical address on the device bus 34 is resident in hardware. The lack of a translation indicates an unsafe operation and causes an interrupt; and the predefined name is sent to a second new input/output driver associated with the control unit 29 called the "resource manager." The resource manager keeps an internal data base of data structures representing input/output devices with physical addresses and contexts under the predefined names. The resource manager looks up this known predefined name in its internal database of data structures with predefined names and finds the data structure defining that device in the data base. The resource manager makes this predefined data structure available for immediate use.

In one embodiment, the data structures are created as objects in an object oriented language. At times hereafter, the data structures will be referred to in this specification as objects. Moreover, commands provided to manipulate such objects are typically referred to as methods; and so, in this specification, commands used to manipulate the data structures are sometimes referred to as methods.

In order to utilize the general device definition provided by the predefined data structure, the application program then sends a "create" command and provides as data its own virtual name for that device and context. The resource manager creates an instance of the predefined data structure in its internal database naming that specific instance with the virtual name the application furnishes (e.g., MY_LINE_DRAWER).

This new data structure includes the various properties of the general device from the data structure with the predefined name including the physical address on the device bus 34 of the input/output hardware which provides the function for the predefined name and a general set of context required by the hardware for operation. At this point, the application program may provide commands to modify the context stored by the new data structure to optimize the operation of the input/output device with the application program.

Using a Data Structure:

When the application program later wants to utilize the newly-named data structure representing an input/output device, the application program writes the virtual name chosen with the special calling command which calls a data structure for the input/output device. The resource manager looks up the new data structure which has been created and (for a physical device) finds the context and physical address on the device bus 34 for the particular input/output device now described by the name. The resource manager changes any context required by the new input/output device which has been named to run the application program. The physical address on the device bus 34 which has been found is then placed in hardware to provide a translation from the input/output bus addresses. When subsequent commands are sent to the same input/output device from the application program, they find the hardware translation and are routed directly to the particular addressed input/output device on the device bus 34.

Unsafe Operations:

In any case in which the input/output device to which the operation is directed is unknown to the hardware of the control unit 29 (an unsafe operation), the unit 29 calls the "resource manager" which runs on the central processing unit and functions as a portion of the operating system. The resource manager determines how the operation is to be handled. The operation may be a write by a new application program (such as that described above) requiring various set up operations before it may proceed. If an operation requires various context changes at the input/output device, this is handled by the resource manager before an address translation for the device is placed in hardware. If an operation requires a procedure which is not yet in order under the operating system such as requiring data from memory which is not in memory at that time, the resource manager transfers the command to the operating system to perform the necessary memory transfers (or the like) which allow the commanded operation to proceed. Alternatively, the operation may be directed to a device which is not otherwise associated with the control unit 29 such as a LAN interface or other bus master or slave on the input/output bus 27 which is not manufactured to cooperate with the unit 29. If such a device is addressed, the command is directed to the operating system by the resource manager and handled by the operating system in the normal manner for input/output devices of the prior art.

Thus, when an operation is unsafe as signified by not having a translation available to it in hardware, the command is sent to the resource manager to assure that only safe operations can be performed.

Address Translations in Hardware:

When the operation involves a device directly associated with the control unit 29 on its device bus 34, the commands after the first commands which are handled by the resource manager (creating the new data structure, attaching its new virtual name, providing any necessary device context, and creating the address translation) are sent by hardware directly to that device for execution. If the command requires that data be transferred to or from the application, the input/output device performs the transfer using the DMA unit 35. Upon the return of data to an application program in response to a command, the DMA unit 35 of the control unit 29 responds by transferring the data to main memory and notifying the central processing unit in a separate DMA operation of the existence of the data so that no input/output bus read operation by the central processing unit 21 is necessary to ascertain the result of the operation or to receive the data provided.

Figure 4:
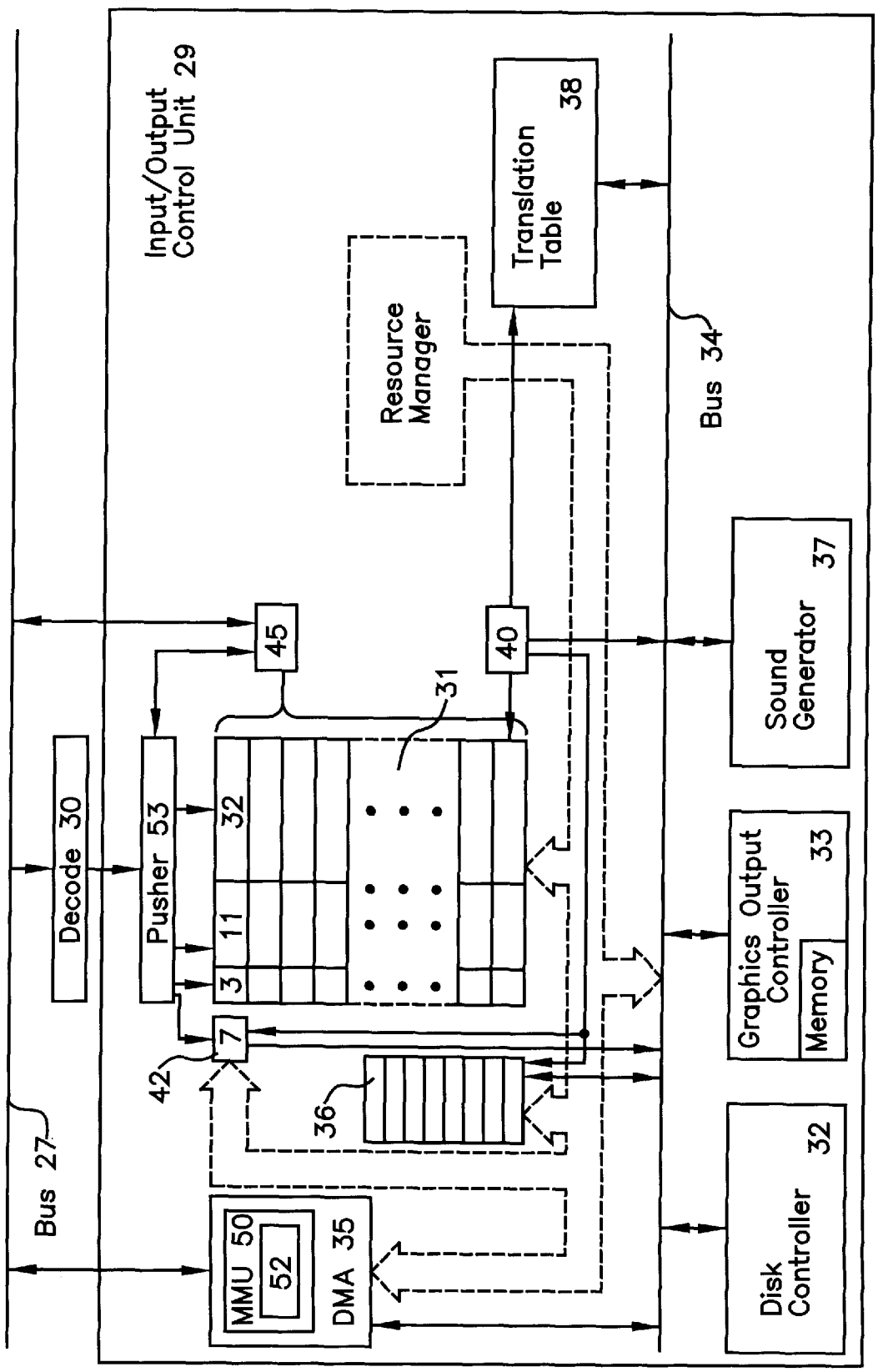
FIG. 4 is a block diagram of a portion of a personal computer system such as that illustrated in FIG. 2 designed in accordance with the present invention.

Specific Details of the New Architecture, the FIFO unit:

FIG. 4 is a block diagram illustrating details of an embodiment of the input/output control unit 29 including the device bus 34 and the input/output devices arranged on that bus. As described above, the input/output control unit 29 includes a decode unit 30 which receives commands directly from the input/output bus 27 and transfers the commands to a pusher circuit 53 which transfers the command to the FIFO unit 31. The FIFO unit 31 stores the data and the addresses for each of the commands being transferred to the input/output devices associated with the input/output control unit 29. The FIFO unit replaces the individual data registers used by input/output devices of the prior art for receiving data. In one embodiment, the FIFO unit 31 has thirty-two stages. This allows it to hold thirty-two individual serially ordered commands at any time. Although in one embodiment each of the stages of the FIFO unit 31 holds (along with the address bits) the data held by an individual register of a typical prior art input/output device, the system has the ability to store commands for over sixteen thousand 32 bit registers for each of 128 different application programs which may map different addresses decoded by the input/output control unit 29.

Figure 5:
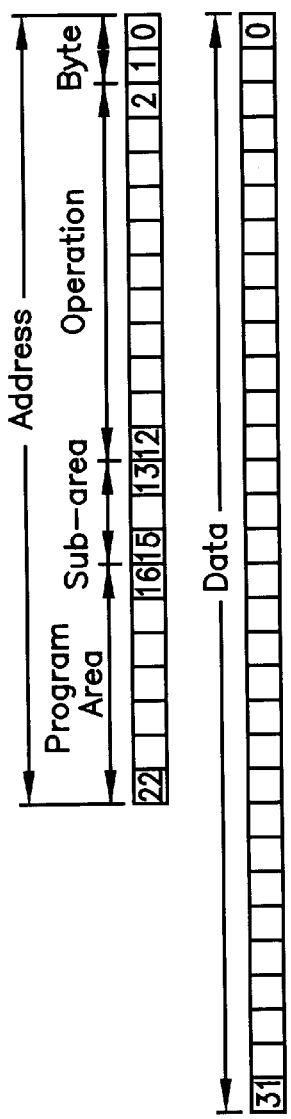
FIG. 5 illustrates the address and data bits utilized in one embodiment of the invention.

The address and data space for each command are pictured in FIG. 5. In one embodiment, twenty-three bits of address space, and thirty-two bits of data space are provided. The twenty-three bits of address space are sufficient to map eight megabytes of address space on the input/output control unit 29. The eight megabytes of address space is divided into the 128 individual areas each having 64 Kbytes which may be allotted by the operating system to an application program. The upper seven bits of the address space are utilized to represent the 128 distinct areas which are available.

There are a number of different embodiments of the FIFO unit 31 which may be used in the new architecture. The type of FIFO unit 31 illustrated includes typically one FIFO buffer for each general purpose processor used in the system. The use of each FIFO buffer is shifted among the various address areas assigned to different application programs so that it functions as a FIFO cache.

Addresses:

In one embodiment of the more complex FIFO unit, the entries in the FIFO unit 31 include thirty-two bits of data space and twenty-three bits of address space. In another embodiment of the FIFO unit 31 which is discussed in detail hereafter, only fourteen bits of address space are provided in the FIFO unit 31 while the upper seven bits are held in a register 42 to reduce overall FIFO size and the lowest two bits are dropped because the data bits are word aligned. The upper seven bits of the address represent the 128 distinct areas of address space which are available and thus define the particular application program utilizing the FIFO buffer 31. When a first command from an application program is transferred to the input/output control unit 29 having an empty FIFO unit 31, the seven bits representing the area designated for that program are placed in the register 42 (in the embodiment utilizing a register) where they are held until the application using the FIFO unit 31 changes. Since each area is assigned to only a single application program, the FIFO unit 31 is in effect a cache for the addresses and data of the particular one of the application programs presently having access to the input/output control unit 29.

The addresses of each of these 128 areas are subdivided into eight separate sub-areas each having eight Kbytes of address space. The next lower three bits of the address space represent these eight sub-areas. The application program treats each of the eight sub-areas identically, designating at various times the physical addresses and the context of various input/output devices or data structures which represent particular input/output devices and their context, to be accessed through each sub-area. As will be seen later, each of these sub-area addresses represents one of eight registers which may store the physical address of an input/output device on the bus 34 and thereby provide an address translation or may store a special value to indicate a software process (e.g., calling a data structure representing an input/output device) is to be run. The two lowest bits of the address space represent byte positions in a command; in the preferred embodiment, the data is word aligned, and these bits are not included in the FIFO buffer 31.

Consequently, eleven bits are left to represent a particular operation using the particular input/output device designated by the address translation in the sub-area. With eleven bits of address space, 2048 individual operations (or portions thereof are available for each sub-area. As mentioned, in one embodiment the data structures are created as objects which represent the devices and their contexts which may be addressed in the sub-areas. The commands to the devices are then encoded as methods on each of these objects. This encoding of a sub-area as an object of a particular class is dynamic, and a new object representing a new device and its context may be encoded in the sub-area by an application program writing the special calling command which calls a device to the sub-area holding the address translation of any object.

As pointed out above, when a program which is able to utilize the present invention first requests that the operating system map a portion of the addresses decoded by the input/output control unit 29 to its address space, the operating system assigns physical addresses designating one of the 128 sixty-four Kbyte address areas of the input/output control unit 29 address space to the application. Thereafter, the application program writes a command with a virtual address to the memory management unit. The virtual address for this command is translated by the memory management unit hardware into a physical address on the input/output bus 27 and sent directly to the input/output control unit 29 at the physical address. The seven highest order bits of the physical address designate the address area assigned by the operating system to the application program. Since the I/O driver #1 is constructed never to map more than one application program to an address area, the seven bits also identify the application.

When an application program writes to the FIFO unit 31, the seven upper bits of the address are used to determine the sixty-four Kbyte address area which the application has been allotted by the operating system. The three bit sub-area designation is the physical address on the input/output bus 27 used to select one of the eight Kbyte sub-areas which may be allotted to a device. The eleven bit offset is used to determine the method for (the command or operation to be carried out by) the device, and the thirty-two bit data space is used for the data related to the commanded operation. In a typical write operation, the write to any particular eleven bit offset invokes a particular method (a command defining the operation to be performed) on the object (the input/output asset designated by the present name for the sub-area). However, these eleven bits are also interpreted (1) to create a new data structure representing input/output devices which respond to virtual names given by the application program, (2) to provide direct translations from virtual names to physical addresses of input/output devices on the device bus 34, and (3) to call the resource manager to perform various software operations.

Figure 7:
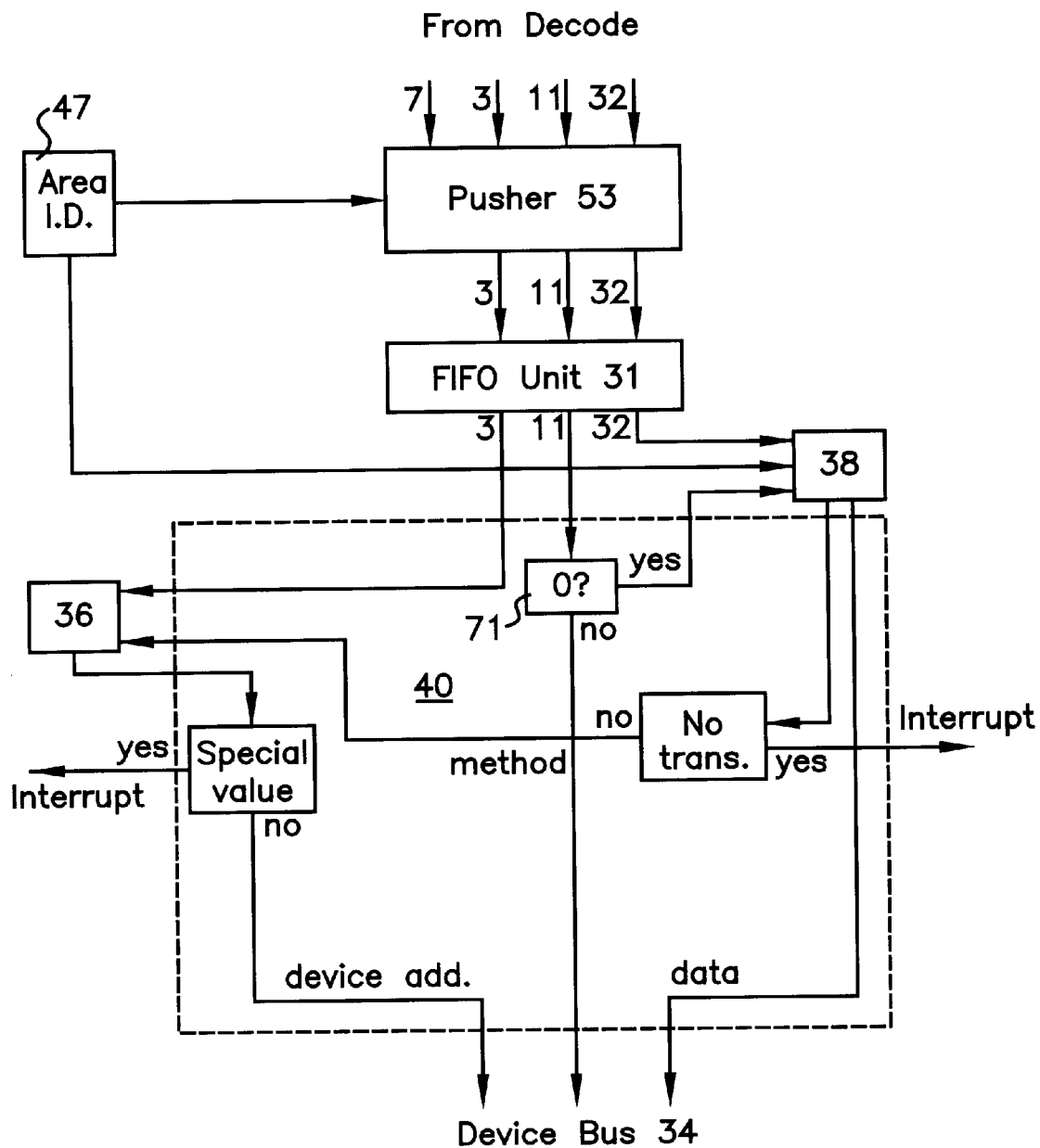
FIG. 7 is a block diagram illustrating details of the circuit of FIG. 4.

The Puller Circuit, Current Address Registers, and Translation Table:

These operations are accomplished by various circuitry and the resource manager, particularly by a puller circuit 40, a current physical address table 36 which includes eight registers capable of holding address translations for devices presently in use, and a translation table 38 which may include a much larger number of address translations. The puller circuit is illustrated in more detail in FIG. 7. In order to correctly direct the address and data provided in each command, the puller circuit 40 reviews the address of the command about to be executed at the bottom of the FIFO buffer 31. The puller circuit 40 includes logic which first uses the three sub-area bits of the address to determine which one of the eight current address registers of the current physical address table 36 has been selected. This current address register will contain the physical address of the input/output device on the device bus 34, will receive the physical address of the input/output device which results from a lookup in the translation table 38, or will indicate a software process is to be run be the resource manager.

Writes to Zero Offset:

The puller circuit 40 also includes logic circuit 71 which then determines whether the next eleven method bits of the address are all zeroes. If the eleven method bits are all zeroes, this indicates a write to the zero offset which is the special calling method used for indicating that the application wants a new translation for an input/output device; and the puller circuit 40 sends the data to the translation table 38 along with the upper seven bits of the address indicating the area and performs a lookup. It will be recalled that when the write is to this special calling method, the data is the virtual name of a device. The result of the lookup is usually an address on the device bus 34 and a physical instance number defining context which are placed in the register of the table 36 pointed to by the three sub-area address bits. When the physical address and instance number are placed in the register of the table 36, the puller circuit sends the seven bits indicating the area and the instance number to the input/output device to change the context on the device. The input/output device uses the seven bits indicating the area and the instance number to assure that it has the correct context. Thus, by writing to offset zero an application program causes an input/output-bus-to-device-bus translations to be made available for immediate use and the correct context to be provided on the device for use with the application before an address translation is used.

The present arrangement allows the application program to select the particular translation which is to be available in the table 36 to translate from system addresses to device bus addresses. In the prior art, this selection has always been accomplished by the operating system.

Writes to Non-Zero Offset:

If the method offset is not zero, the puller circuit 40 takes the three bits indicating the sub-area and indexes into the table 36 to the proper register to find the device bus physical address. The puller circuit 40 concatenates that address with the eleven bit offset designating the method and writes the method and thirty-two bits of data to that physical address on the bus 34. However, if instead of a physical address, the value read from the sub-area of the table 36 is a special value which indicates a failed translation, the puller circuit 40 generates an interrupt which calls the resource manager. The resource manager then uses the command at the bottom of the FIFO buffer 31 to perform whatever software operation is required by the command. This assures that unsafe operations are always handled by the operating system.

Figure 6:
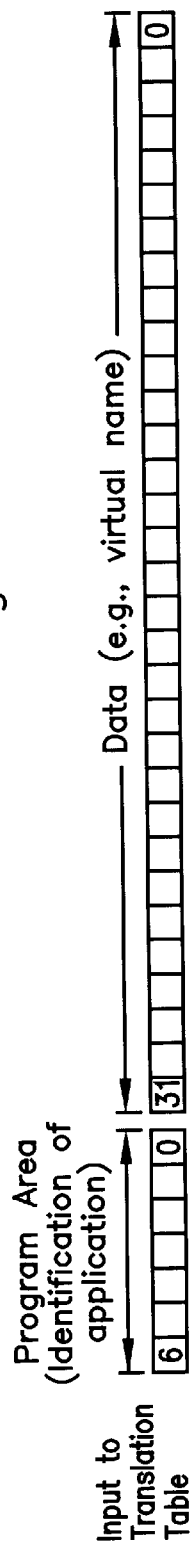
FIG. 6 is an illustration of entries in a translation table used in accordance with the invention.
Figure 6:
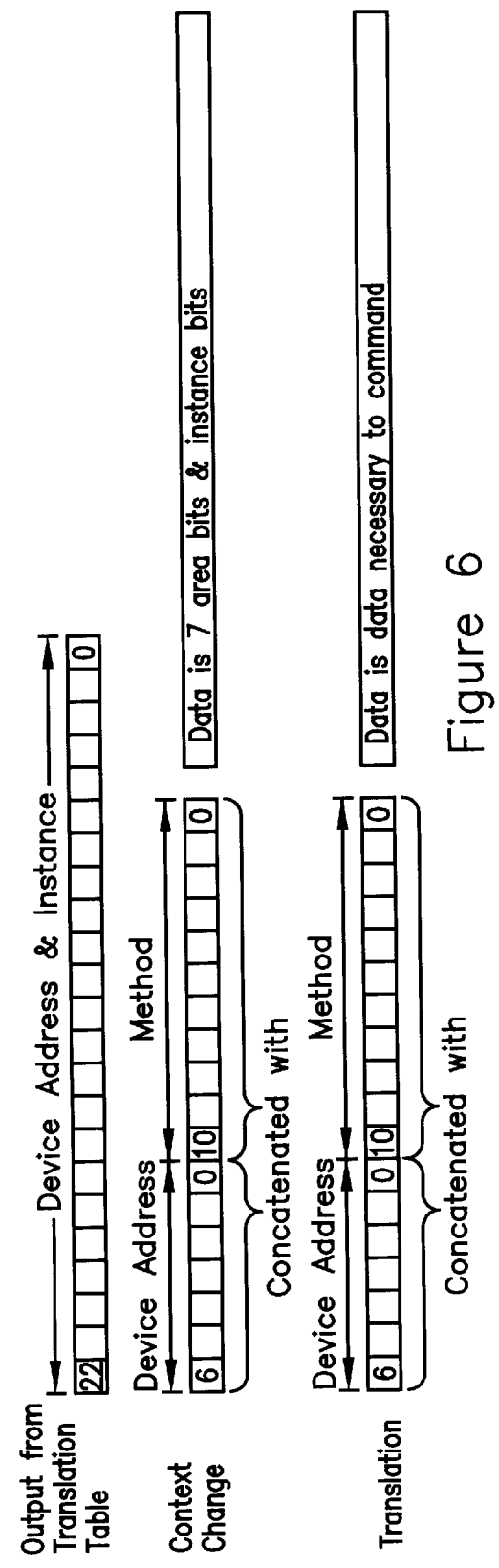

FIG. 6 illustrates in the first two lines one entry in the translation table 38 utilized in one embodiment of the present invention. In the specific embodiment described, the translation table 38 may be designed as a hash table or a lookaside buffer. As may be seen, the seven bits of the address designating the area assigned to an application program and the thirty-two bit virtual name translate into twenty-three bits seven of which indicate the address of the physical device on the device bus and sixteen of which indicate the instance of the data structure which provides the context to be placed on the input/output device. Additional control bits may also be included as a part of the translation data stored in the table 38 but are not shown. The hash table form is especially convenient because the lack of a translation typically returns a zero which may be used as a special value in the table 36 in the manner described herein. Each of the last two lines of FIG. 6 indicates one way in which the bits obtained in the translation are used. The eleven bits indicating the method invoked are concatenated with the physical address for the device retrieved from the translation table 38, and the concatenated value is placed on the bus 34 with data. Each of the input/output devices decodes addresses on the bus 34 to determine if it is the addressed device and responds accordingly to the operation indicated by the method.

Creation of a Data Structure:

When an application program first writes to the area which it has been allotted by the operating system and presuming that no other application is presently utilizing the FIFO unit 31, the command is ultimately reviewed by the associated puller circuit 40. The puller circuit will find that the application program has selected one of the sub-areas using the three bit sub-area designation, selected an offset zero using the eleven bits, and has written a predefined name for a particular input/output device in the thirty-two bit data space. When the application program selects a zero offset as the eleven bits representing an operation, the application is indicating that it desires to call a data structure which has been named and make it immediately available for use. When a zero value is written as the eleven bit offset to any one of the sub-areas, this instructs the input/output control unit 29 to make available that one of the sub-areas to the newly-named object and to interpret eleven bit offsets within the sub-area as the various methods which are available to an object of that class.

When the register holding the translation for a sub-area has been allotted to the particular object, the methods of that object are thereafter invoked by writing to the different eleven bit offsets available for that particular object.

When the application program writes the name of a data structure as data to offset zero of a sub-area, the puller circuit 40 takes the virtual name, adds the seven bits designating the area, and looks up the concatenated value in the translation table 38 to obtain the physical address on the device bus 34 and the instance of the physical device which is responsible for the operation represented by the particular object being named. If a translation is in the table 38, the physical address on the bus 34 of the hardware (e.g., line drawing hardware in the graphics rendering engine) should be returned and placed in one of eight positions (registers) of the current physical address table 36 designated by the three bit sub-area to which the zero offset was written. However, if the translation for the physical object does not exist in the translation table 38 of the input/output control unit 29, the translation table 38 returns a miss and places a special value (all zeroes in one embodiment) in place of the physical address in the addressed register of the table 36. The miss transfers the operation to the resource manager which uses the command at the bottom of the FIFO buffer to perform whatever software operation is required by the command.

Because on a first write to the input/output control unit 29 by an application program, there will be no translation for the named data structure in the translation table, the operation will be transferred to the resource manager. The resource manager in the preferred embodiment of the invention has access to the database which includes the data structures for a number of predefined objects. These objects may represent hardware or software which implements various portions of the input/output operations. When an application program writes the name of a predefined object at an offset zero in one of the eight sub-areas, this is a request to the resource manager to make the predefined object one of the eight objects available for immediate use at the addressed one of the eight sub-areas.

The resource manager reviews the details of the command being written and determines that is a write to a zero offset. This causes the resource manager to look at the predefined name to determine the class of the object. When it determines that this is a name for one of the predefined general classes of objects associated with the input/output control unit 29, the resource manager looks up the data structure for that object and makes that object immediately available. To make the object immediately available, the resource manager allots the sub-area to the predefined object but also places a special code in the table 36 to indicate that the object is a software object and the resource manager is to be called when the predefined object is addressed.

The application program follows this command calling the predefined data structure with a command directed to the same sub-area to create an instance of the predefined data structure in the database and name it as the application program defines in the data bits of the create command. The resource manager interprets the create command as a create method for the predefined object and creates a new instance of the predefined class of objects, names the instance using the name requested by the application program, and stores it as a new data structure in the object database.

Modifying Context of Newly-Created Data Structure:

If the application program desires to modify the context values of the input/output device for which it has created a new object, it writes the name it has selected for the object as data to the zero offset address. The puller circuit 40 causes a lookup in the translation table 38 using the new virtual name and the seven bit area identification. Again, there will be no translation for that virtual device name in the translation table 38 since the data structure which has been created is a software object which has no translation in the table 38; the special value is placed in the table 36 to indicate a software object; and the operation will be transferred to the resource manager. The resource manager reviews the command and determines that is a write to a zero offset. This causes the resource manager to look up the new data structure with that virtual name in the object database to find the object which defines the input/output device. The resource manager uses the seven bits designating the area allotted to the application program and the thirty-two data bits providing the virtual name given by the application to find objects in its database.

When the resource manager finds the data structure, it places the special value in the addressed register of the table 36 instead of an address on the device bus 34 to indicate that this is still a software device. Until the physical device is utilized, the application program may send various commands as methods on the new object; and these will be executed by the resource manager. A plurality of low numbered offsets are utilized for modification of a software data structure. For example, the application program may send commands which set the details of the appropriate context values for that particular device functioning with the particular application for the particular purpose. This changing of context from the context provided by the predefined data structure typically occurs before the device is utilized while only the software object is affected.

Placing Safe Translations in the Translation Table:

Ultimately, when a physical input/output device receives a command which makes a first use of the physical device, the resource manager places a translation for the particular virtual-name-to-device-bus-address of the appropriate physical device in the translation table 38.

It should be noted that the virtual name selected by an application program for a particular data structure representing an input/output device and its context is used for the later retrieval of the address translation for that that input/output device. In fact, a number of different application programs may use the same virtual name for the same or different virtual objects without causing any ambiguity because each object created has its own separate area address bits which relate to that application alone.

In any case in which a translation for the virtual name to the device bus address for a new physical object is placed in the translation table 38, a number of additional bits which define the instance of the data structure and therefore indicate any context which is presently a part of the data structure and is necessary for the operation of the device with the application is also stored in the translation table 38 by the resource manager. Among these are a bit indicating that the particular input/output device is to be enabled. As will be seen by storing these context values, the translation table 38 is being used to trap operations which require context switching before a device is allowed to perform an operation. Finally, the resource manager restarts the write operation. The lookup in the translation table 38 then succeeds. This causes the physical address and instance value (also called context value) to be placed in the register of the table 36 and the puller 40 to send the seven area bits and instance value to the input/output device to change the device context.

When an application program writes the virtual name of an object to offset zero in one of the sub-areas, and when the lookup in table 38 of that virtual name succeeds, the physical address of the corresponding device on the device bus 34 and the instance value are also stored in a slot of the eight entry current physical address table 36 which slot corresponds to the sub-area to which the virtual name was written. The table 36 stores the physical address on the device bus 34 of the device corresponding to the current object accessible in that sub-area, if there is such a device. If there is not a physical device or there is no translation in the table 38, the entry stores the special value which has no translation and therefore causes the input/output control unit 29 to interrupt into the resource manager.

When the physical address on the device bus 34 and the instance value of the device corresponding to the current object are first placed in a register of the current address table 36, the address is used by the puller circuit 40 to send the instance value and the seven bits indicating the application program (and the address area) to the device on the device bus 34 (see line three of FIG. 6). The device compares the seven bits and the instance value to the area and instance it is presently utilizing. If they differ, the device changes its context or interrupts the resource manager to change its context so that the device is properly initialized for the application program.

Thus, whenever an application program selects a different input/output device to utilize a sub-area of the address space by writing to offset zero of a register of the table 36, the change of input/output device causes the puller to send the area bits and the instance value to the input/output device to change any required context.

Writing Directly to Input/Output Devices:

With the address translation in a register of the table 36, when a next write occurs to that object as indicated by the three bits of the address selecting the register for the particular sub-area, the offset address will typically be other than zero. This offset will indicate the method invoked on the object. This method (indicated by the eleven bits) is concatenated with the physical address held in the table 36 (see line four of FIG. 6) and broadcast on the device bus 34 to select the particular input/output device and the operation indicated by the method which is to be performed by that device. All of the devices on the device bus 34 listen on the bus and decode commands addressed to them.

Current Address Registers and Sub-Areas:

Since eight sub-areas are available at once through the current address table 36, an application program may write up to eight virtual names for devices the application desires to utilize in input/output operations and have physical addresses for those devices immediately available by simply writing the virtual name to the zero offset of a sub-area. As has been explained, this is initially accomplished for each device by writing a predefined object name to the zero offset to place that object in a sub-area, creating an instance of that predefined object representing an input/output device using a virtual name chosen by the application program, writing the new name as data to the zero offset to place the newly-created object in a sub-area, and calling the resource manager when it is found that there is no translation for that device name in the translation table. The resource manager determines that is a write to a zero offset, finds the data structure for the newly-named object, stores a translation for the virtual name to the device bus address of the appropriate device in the translation table 38 along with the instance value indicating the device context, causes the puller to store the context for the named object in the physical device, and restarts the write operation so that the lookup in the translation table 38 succeeds and so that the physical address of the corresponding device on the device bus 34 is stored in the register of the current physical address table 36 which corresponds to the sub-area to which the virtual name was addressed. Thus, the application program may select each of eight objects representing devices for which the translations are then immediately available in the registers representing the eight sub-areas.

Thus, up to eight objects (devices) may have address translations immediately available in the table 36 for the application program using the FIFO unit 31. For example, one sub-area may have addresses for a line drawing object. This object will respond to various of the 2048 possible methods available to provide different operations by that device. One of the methods may designate the beginning point of a straight line; another may designate the end of the line. By invoking these methods on the line drawing object in order, a line may be caused to be drawn on the display by a hardware graphics engine. Another of the sub-areas may hold a color table. Commands to this sub-area may invoke a method to fill a portion of a color table of a hardware digital-to-analog converter to control the color mode of the output display. It should be noted that it is possible for an application program to have a number of differently named data structures and associated contexts for the same actual physical input/output device. For example, an application program may provide different context values for color tables to provide different display results. To make sure that the correct context is on a device, whenever an application program switches to a different register of the table 36, the change of sub-area address causes the puller circuit 40 to send the address area bits and the instance value to the input/output device to change any required context.

Changing the Input/Output Device in a Sub-Area:

The eight sub-areas available provide a large number of output options for an application program. The availability of eight sub-areas allows the application to accomplish a number of functions without the necessity of a translation table lookup and thus speeds input/output operations. However, since any application program may need to have access to all of the input/output assets which are available, the system provides a rapid manner of providing assets in addition to the eight devices which are represented by objects which fill the eight sub-areas allotted to that application program. When all of the eight sub-areas have been used by an application program so that input/output-to-device bus physical address translations for a device exist in each of the eight spaces in the table 36 and the application program running desires to write to a different input/output device, the application program may select a new device which it desires to use and place its address translation in the table 36 in place of any address translation presently occupying one of the registers. To accomplish this, the application program writes a new virtual name of a device as data directed to the zero offset of any of the eight sub-areas. This causes the input/output control unit 29 to replace the object presently occupying the sub-area with a new object representing the device indicated by the newly presented virtual name. This is accomplished by the puller circuit 40 initiating a lookup in the translation table 38 and a replacement of the device bus address and instance representing context in the table 36 designating the object presently in the sub-area with the device bus address of the new device if a translation for the new object for the physical device has already been placed in the translation table 38 by the resource manager. Whenever an application program places a different translation in a register of the table 36, the change of address causes the puller to send the area bits and the instance value to the input/output device to change any required context.

However, if this is the first use of this object by the application program, the name-to-physical-address-translation is not in the translation table 38. The new virtual name causes the virtual-name-to-physical-address translation to miss in the translation table 38 so that the operation is trapped and sent to the resource manager. Presuming that an instance of a predefined data structure has already been created under the virtual name, the resource manager recognizes the zero offset as calling for a new object, reviews the new name, and finds the data structure for that name in the database. It uses the object data structure to obtain the instance value indicating the context for that new input/output device and writes the virtual-name-to-physical-address translation and instance value into the translation table 38. The operation then proceeds and succeeds, the physical address and instance value for the object is placed in the current physical address table 36 in the sub-area in which the object being replaced previously resided, and the context of the device is updated. When the next write occurs for that named input/output device, the physical address translations for that device (object) will be in the current physical address table 36 so that it may be immediately placed on the bus 34. Thus, the resource manager is called and assures that the context on an input/output device is correct before its address translation is placed in the physical address table 36.

Whenever any object is named for which the physical address is not in the current physical address table 36 but for which a translation is available in the translation table 38, the lookup of that virtual name succeeds, the physical address and the instance value of the corresponding device on the device bus 34 is stored in a slot of the current physical address table which corresponds to the sub-area to which the virtual name was written. Thereafter, writing to an offset to this sub-area selects the particular input/output device and the operation (indicated by the method) which is to be performed by that device.

Creating Patchcord Objects:

The present invention eliminates the need for an application program to provide the context for enabling the individual connections by which input/output devices are placed in a pipeline that processes data being transferred from a source to a destination. Instead the present invention allows a simple set of commands to be used to accomplish sequencing of the operations. Essentially, the application program specifies the device which is to provide the data to be transferred, the device which is to receive the data, and provides a link or patchcord by which the data is to be carried. The specification of the link by which the data is to be carried generates a software path which in use is translated into context to be placed on all of the units of an input/output device to create the pipeline by which the operations are implemented in the proper order. The specific context required for the input/output device to provide the path is prepared by a designer of the input/output device so that the application program is not required to deal with the details of the context application by closing the switches to connect the various operational elements. In this manner, the connection context is provided not by the application programmer but by the designer of the input/output resources which are called to convey the data from one device to the next. On the other hand, the application programmer has complete control over the routing for accomplishing the individual input/output operations.

Programming Example:

Assuming an object is not one of the predefined objects, an object must first be created. This is done by invoking a create method on a predefined object. This is done by choosing a sub-area, writing the name of the predefined object of which the new object is to be an instance to the method designated by offset zero in the chosen sub-area. This places the well known predefined object in the chosen sub-area. To create the new instance of the predefined object, the name of the new object is written as data to offset zero of any sub-area. This places the new instance of the object in the chosen sub-area.

In order to use the newly-created object MY_RENDER_SOLID_LINE, a patchcord object MY_PATCHCORD_IMAGE must be created in the same manner as a new renamed instance of a predefined patchcord object XX_PATCHCORD_IMAGE. Moreover, a new renamed instance MY_IMAGE_TO_VIDEO of the predefined object XX_IMAGE_TO_VIDEO must have also been created to represent the frame buffer function by which positions of a line having appropriate color characteristics in a frame buffer may be scanned to the output display by the video refresh operation.

In order to use the line drawing device to draw a line, the name of the instance of the patchcord object (MY_PATCHCORD_IMAGE) is written as data to the method of the object MY_RENDER_SOLID_LINE which designates an image output. Additionally, the name of the patchcord object must be written to an image input method of the object MY_IMAGE_TO_VIDEO to represent the connection between the line drawer and the frame buffer.

Then a color format for the line to be drawn is written as a method to the object MY_RENDER_SOLID_LINE to provide the color format to be used in drawing the line. Additionally, a value of a suitable color is chosen by writing a color value to a method offset of the object MY_RENDER_SOLID_LINE.

Once all of these conditions have been established, the state of the line drawing device is determined. Then, to write to the output display, the beginning and end points of the line to be written are provided as data to offsets indicating beginning and end points of a line which are methods of the object MY_RENDER_SOLID_LINE.

For example, the following exemplary commands may be used to create the object MY_RENDER_SOLID_LINE, rename the object, attach it to the patchcord object MY_PATCHCORD_IMAGE, provide proper color, and designate the length of the line to be drawn in order to accomplish the above-described process:

| Write | S-area | Offset | Data | Action |
|---|---|---|---|---|
| 1 | A | 0 | XX_RENDER_SOLID_LINE | call |
| 2 | A | 0X0300 | MY_RENDER_SOLID_LINE | create |
| 3 | A | 0 | XX_IMAGE_TO_VIDEO | call |
| 4 | A | 0X0300 | MY_IMAGE_TO_VIDEO | create |
| 5 | A | 0 | XX_PATCHCORD_IMAGE | call |
| 6 | A | 0X0300 | MY_PATCHCORD_IMAGE | create |
| 7 | B | 0 | MY_IMAGE_TO_VIDEO | call |
| 8 | B | 0X0200 | MY_PATCHCORD_IMAGE | con/input |
| 9 | B | 0 | MY_RENDER_SOLID_LINE | call |
| 10 | B | 0X0200 | MY_PATCHCORD_IMAGE | con/output |
| 11 | B | 0X0330 | XX_COLOR_LE_A8R8G8B8 | color format |
| 12 | B | 0X0304 | 0xff000000 | color |
| 13 | B | 0X0400 | [startx, starty] | start point |
| 14 | B | 0X0404 | [endx, endy] | end point |

Ignoring other operations of the system, the following sequence occurs in response to these commands. When the puller finds write 1, it concatenates the seven bits of area identification with the thirty-two bits of data and looks up the result in the translation table since this is a write to offset zero. There is no translation since the class is implemented entirely in software so the lookup returns a special value indicating a lookup failure. This value is stored in the current physical address table with the sub-area identification. With write 2, the predefined object XX_RENDER_SOLID_LINE is renamed as a new instance MY_RENDER_SOLID_LINE of the object; and a data structure is created for the new instance. Similarly, writes 3–6 create new instances called MY_IMAGE_TO_VIDEO and MY_PATCHCORD_IMAGE of predefined objects XX_IMAGE_TO_VIDEO and XX_PATCHCORD_IMAGE. With write 7, the new instance of the object MY_IMAGE_TO_VIDEO is called to sub-area B. Write 8 designates MY_PATCHCORD_IMAGE as an input for the object MY_IMAGE_TO_VIDEO in sub-area B. Write 9 calls the new instance of the object MY_RENDER_SOLID_LINE to sub-area B. Write 10 designates MY_PATCHCORD_IMAGE as an output for the object MY_RENDER_SOLID_LINE in sub-area B. Write 11 designates the color format to be used in setting the color for the object MY_RENDER_SOLID_LINE in sub-area B. Write 12 indicates the color to be used for the solid line to be generated by the MY_RENDER_SOLID_LINE engine. Writes 13 and 14 indicate the start and end of the line to be created.

Validating the Pipeline:

On write 14, when the entire pipeline for a piece of input/output circuitry such as a graphics controller has been completed and before the pipeline is utilized, a process called patch validation takes place. In this process, the resource manager creates a validated data structure which will be utilized to place context on the entire input/output device in which the pipeline is to be generated. In generating this validated data structure, the resource manager goes through each possible operation which may be accomplished by a part (e.g., line drawer circuitry) of a particular input/output device (e.g., the graphics controller) to determine whether that operation is to be enabled. If an operation is to be enabled to form a step of the pipeline, the resource manager tests to determine that the particular operation can occur at the particular point in the sequence chosen by the application programmer using the patchcord objects. If the operation can occur at that point, the resource manager provides in the map as to each operation, an indication that the operation is to be enabled and the conditions to cause this to occur. If the operation cannot occur in this particular position of the sequence, the resource manager generates an error signal.

In creating the sequence of operations, the resource manager also checks to determine for each operation which is to be enabled which hardware registers are to be filled to provide context for that operation (e.g., what values are to be placed in color tables). The resource manager tests to determine whether any other use is being made of each register which is to include the particular context for an operation. If a register is already in use, then the sequence of operations is incorrect and an error signal is generated.

Ultimately, the validated patch object is created with all of the context which is to be placed on the entire particular input/output device for which the pipeline is created. This context is then placed on the input/output device so that the sequence of operations may take place.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A method of controlling the routing of input/output operations utilizing input/output processing elements within a computer to produce multimedia effects comprising the steps of:

providing a series of commands expressing connections between sources of data, processing elements, and destinations for data to carry out an input/output operation;

compiling a data structure for the input/output operation from the series of commands, the data structure including context defining connections between each of the sources of data, processing elements, and destinations for data; and using the data structure to set connecting context to make the connections expressed between each of the sources of data, processing elements, and destinations for data whenever the input/output operation is to be accomplished.

2. A method as claimed in claim 1 in which the step of compiling a data structure for the input/output operation from the series of commands comprises the steps of:

creating and naming data structures for each of the sources of data, processing elements, and destinations for data;

creating and naming connection data structures;

defining connections between each of the sources of data, processing elements, and destinations for data commanded for the input/output operation by indicating a connection data structure making each connection; and forming a data structure for the input/output operation from the defined connections.

3. A method as claimed in claim 2 in which the step of defining connections between each of the sources of data, processing elements, and destinations for data commanded for the input/output operation by indicating a connection data structure making each connection comprises, for each connection, the steps of:

naming a connection data structure as an input to one of the processing elements and destinations for data in the data structure defining each of the sources of data, processing elements, and destinations for data; and naming the same connection data structure as an output from one of the sources of data and processing elements in the data structure defining each of the sources of data, processing elements, and destinations for data.

4. A method as claimed in claim 2 in which the step of defining connections between each of the sources of data, processing elements, and destinations for data commanded for the input/output operation by indicating a connection data structure making each connection comprises, for each connection, the steps of:

naming one of a group including the sources of data and the processing elements as an input to one of the data connection data structures in the data connection structure; and naming one of a group including the processing elements and the destinations for data as an output for the same connection data structure in the data structure.

5. A method as claimed in claim 2 in which the step of forming a data structure for the input/output operation from the defined connections comprises storing an indication of physical connections to be made represented by each connection data structure and the sources of data, processing elements, and destinations for data connected by each physical connection.

6. A method as claimed in claim 2 in which the step of forming a data structure for the input/output operation from the defined connections comprises:

testing each of the data structures representing sources of data, processing elements, and destinations for data to form a first graphical mapping of the input/output operation, and utilizing a table including values required to make connections to compile a second data structure for the input/output operation defining values required to make connections to form a pipeline for the input/output operation.

7. A method as claimed in claim 6 in which the step of utilizing a table including values required to make connections to compile a second data structure for the input/output operation includes utilizing remapping values to determine register values for causing processing to accomplish processing operations when inputs appear at different input terminals.

* * * * *